(12) United States Patent
Saiki

(10) Patent No.: US 8,885,214 B2
(45) Date of Patent: Nov. 11, 2014

(54) COLOR IMAGE PROCESSING APPARATUS WHICH REDUCES THE AMOUNT OF COLOR MATERIALS CONSUMED THAT ARE USED TO FORM A COLOR IMAGE WITH REFERENCE TO AN INDEX WITH HIGH UTILITY

(75) Inventor: Tomoyuki Saiki, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 389 days.

(21) Appl. No.: 13/209,309

(22) Filed: Aug. 12, 2011

(65) Prior Publication Data

US 2012/0050766 A1 Mar. 1, 2012

(30) Foreign Application Priority Data

Aug. 31, 2010 (JP) ................................. 2010-195133
Aug. 31, 2010 (JP) ................................. 2010-195134

(51) Int. Cl.
*G06F 3/12* (2006.01)
*H04N 1/60* (2006.01)
*G03F 3/08* (2006.01)
*H04N 1/46* (2006.01)
*H04N 1/36* (2006.01)

(52) U.S. Cl.
CPC ................................. *H04N 1/6027* (2013.01);
*H04N 1/6016* (2013.01)
USPC ........... 358/1.9; 358/1.15; 358/523; 358/534; 358/538

(58) Field of Classification Search
USPC ........ 358/1.9, 1.1, 2.1, 3.01, 3.23, 3.06, 3.13, 358/3.17, 302, 534, 53, 5, 536, 519, 538, 358/488; 382/282, 190, 162, 167, 274–275, 382/286, 319, 166, 112; 399/39, 51, 45, 46, 399/49, 27, 54, 59, 61, 65, 72, 57, 40
See application file for complete search history.

(56) References Cited

U.S. PATENT DOCUMENTS

| 5,132,786 | A  | * | 7/1992 | Ishiwata | ........................ 358/500 |
| 7,460,268 | B2 |   | 12/2008 | Goto et al. | |
| 2004/0001228 | A1 | * | 1/2004 | Goto et al. | ...................... 358/2.1 |
| 2004/0196479 | A1 | * | 10/2004 | Foster et al. | ................... 358/1.9 |
| 2008/0259367 | A1 | * | 10/2008 | Oka | ............................... 358/1.9 |

(Continued)

FOREIGN PATENT DOCUMENTS

| CN | 1477855 | 2/2004 |
| JP | 9-244475 | 9/1997 |

(Continued)

OTHER PUBLICATIONS

Xiaohui, Chinese Office Action, Dec. 16 2013, Listed on IDS, Application No. 201110254133.8, all pages.*

(Continued)

*Primary Examiner* — Ngon Nguyen
(74) *Attorney, Agent, or Firm* — Fitzpatrick, Cella, Harper & Scinto

(57) ABSTRACT

The present invention provides a color image processing apparatus which reduces the amount of color materials consumed that are used to form a color image with reference to an index with high utility. To accomplish this, a color image forming apparatus of the present invention is a color image processing apparatus which applies image processing to image data of an input color image, and outputs the processed image data, and which changes tone values of respective colors of the color image, so that a conversion result obtained when image data of the color image are converted into amounts of color materials becomes an amount based on a reference conversion result, the reference conversion result being obtained when the image data are color-converted by a predetermined color conversion method and the converted data is further converted into an amount of a color material.

25 Claims, 21 Drawing Sheets

(56) References Cited

U.S. PATENT DOCUMENTS

| | | |
|---|---|---|
| 2009/0018881 A1 | 1/2009 | Ito et al. .............................. 705/7 |
| 2011/0069325 A1* | 3/2011 | Kawashima et al. ........... 358/1.1 |
| 2011/0170142 A1 | 7/2011 | Ito et al. ....................... 358/3.24 |

FOREIGN PATENT DOCUMENTS

| | | |
|---|---|---|
| JP | 2009-18460 | 1/2009 |
| JP | 2010-68497 | 3/2010 |
| JP | 2010-89487 | 4/2010 |

OTHER PUBLICATIONS

Chinese Office Action dated Dec. 16, 2013 for Chinese Application No. 201110254133.8.

* cited by examiner

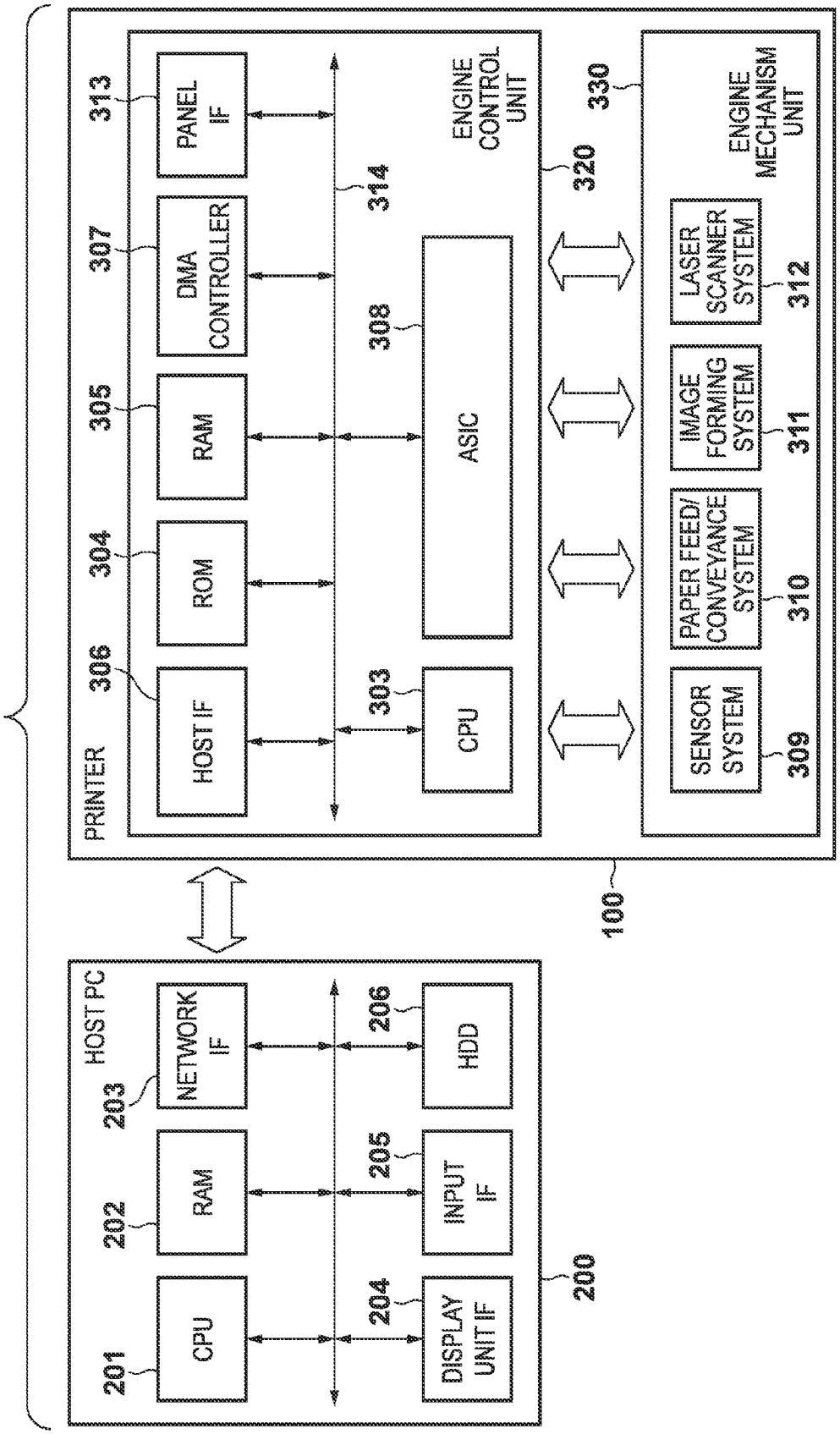

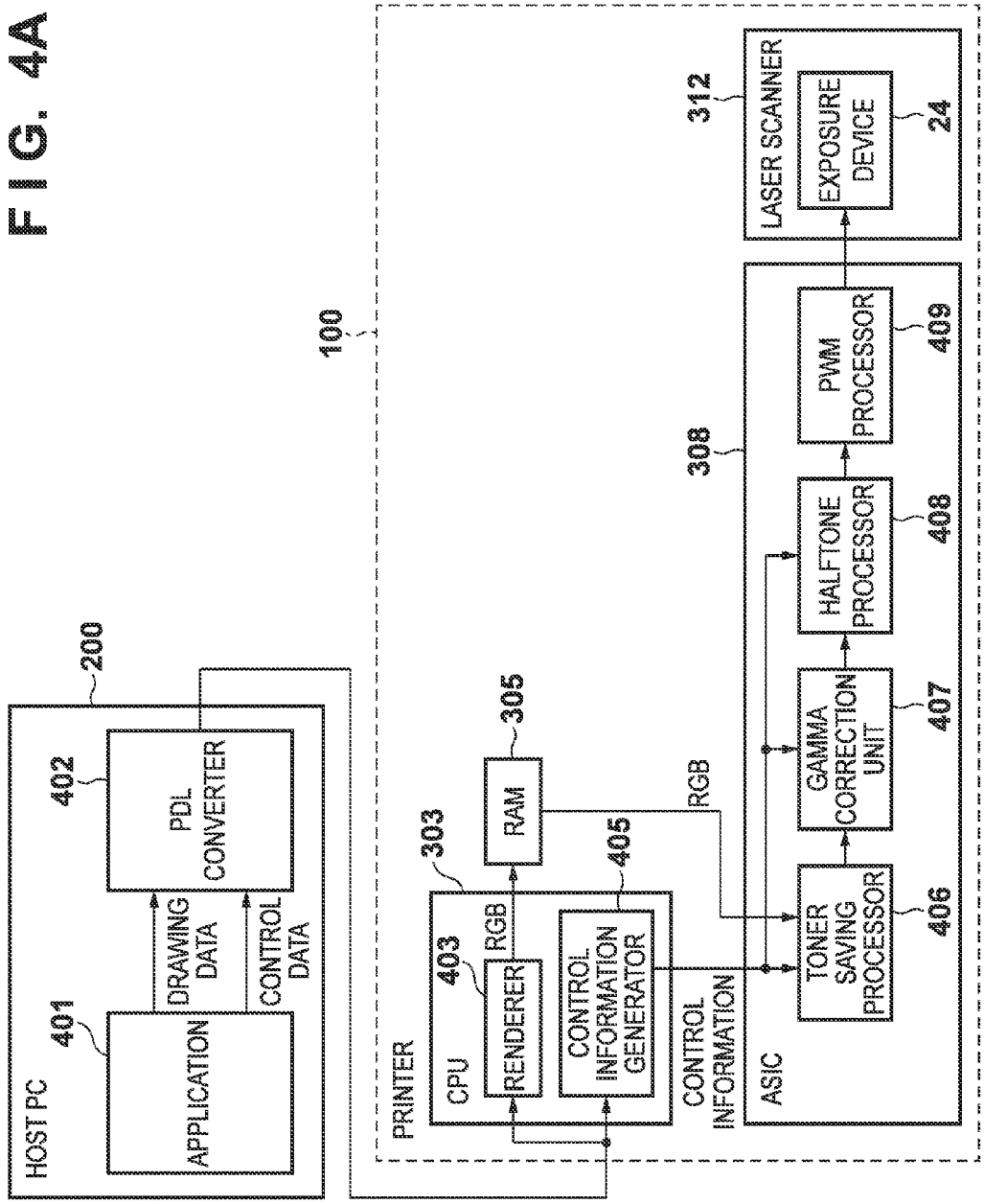

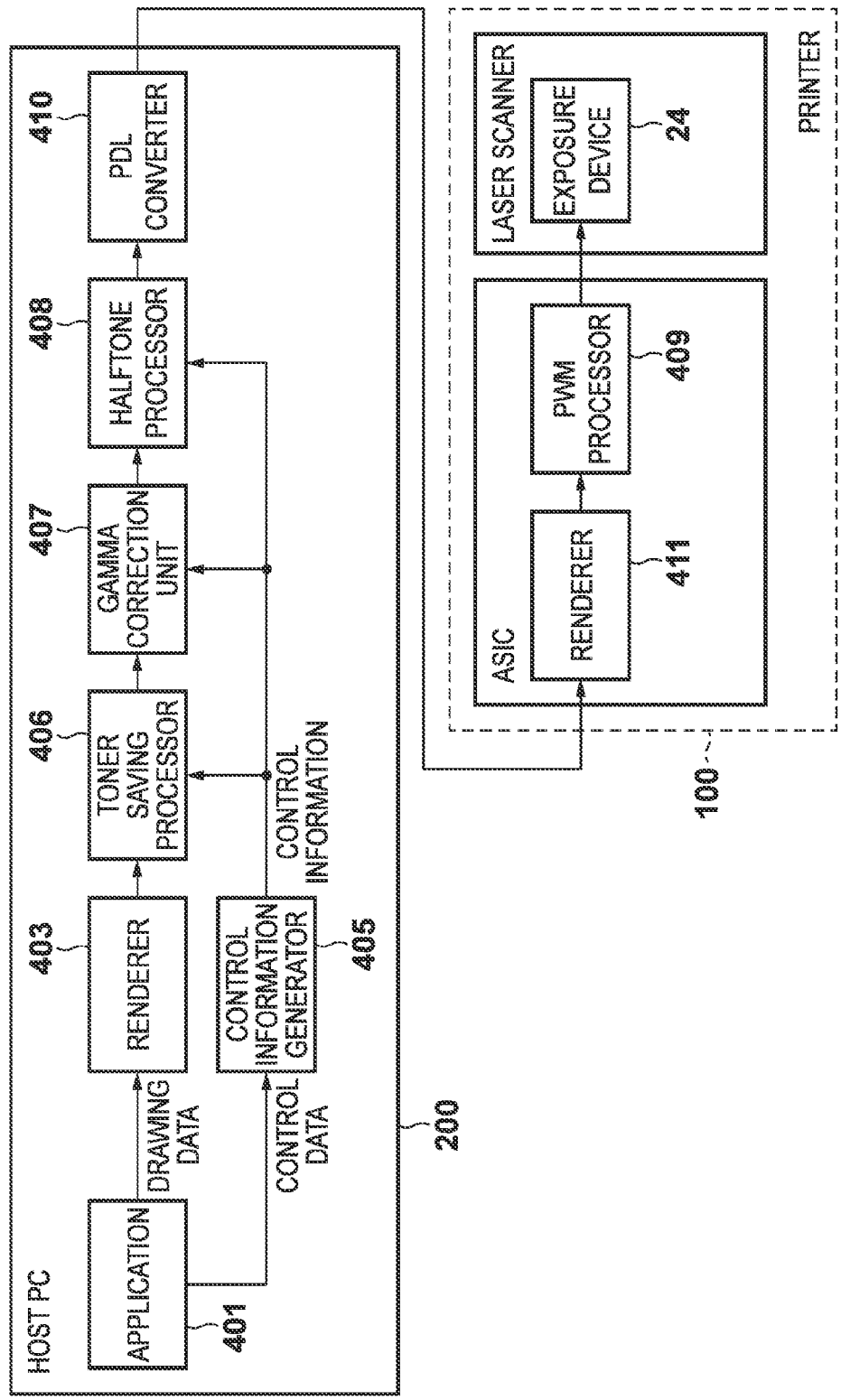

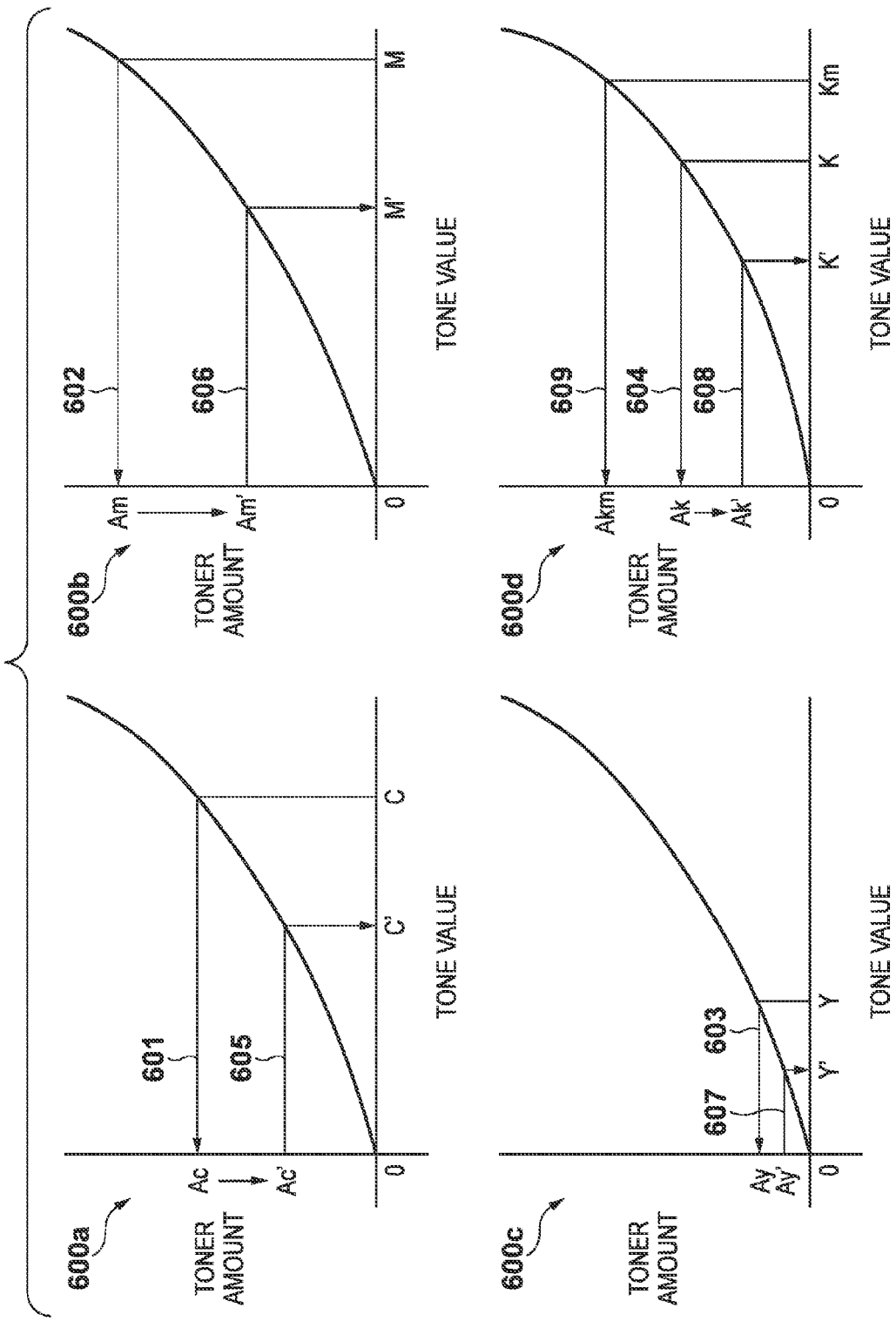

F I G. 16

COST COEFFICIENT TABLE

| COLOR | COST COEFFICIENT |
|---|---|
| C | Qc |
| M | Qm |
| Y | Qy |
| K | Qk |

~1600

COLOR IMAGE PROCESSING APPARATUS WHICH REDUCES THE AMOUNT OF COLOR MATERIALS CONSUMED THAT ARE USED TO FORM A COLOR IMAGE WITH REFERENCE TO AN INDEX WITH HIGH UTILITY

BACKGROUND OF THE INVENTION

1. Field of the Invention

The present invention relates to a color image processing apparatus and storage medium.

2. Description of the Related Art

Image forming apparatuses such as printers and copying machines, which adopt a digital system that forms an image based on digital drawing data, have prevailed in place of those which adopt an analog system, upon development of digital apparatuses. In such image forming apparatus, developing materials (toners) and inks are used as color materials used to form an image on a recording medium. Then, it is demanded for the user not to waste toners as much as possible. Under such background, for the purpose of reducing the cost of color materials, some image forming apparatuses include a function for executing print processing while reducing the consumption of color materials (toner saving function) in addition to a normal image forming (printing) function.

For example, Japanese Patent Laid-Open No. 9-244475 discloses a technique which executes tone conversion of an input image by changing a color conversion table and gamma correction table to those for a save mode in the save mode of reducing the amount of color materials consumed.

However, in the aforementioned related art, although the user can understand the fact that the consumption of color materials are reduced, but in practice it is difficult for the user to know how the consumption of color materials are reduced. That is, a mechanism is needed to reduce the amount of color materials consumed that are used to form a color image with reference to an index with higher utility upon clearly expressing a resource saving effect.

SUMMARY OF THE INVENTION

The present invention has a technical feature of reducing the amount of color materials consumed that are used to form a color image with reference to an index with higher utility.

According to one aspect of the present invention, there is provided a color image processing apparatus, which applies image processing to image data of an input color image, and outputs the processed image data, comprising: a change unit that changes tone values of respective colors of the color image, so that a conversion result obtained when image data of the color image are converted into amounts of color materials becomes an amount based on a reference conversion result, the reference conversion result being obtained when the image data are color-converted by a predetermined color conversion method and the converted data is further converted into an amount of a color material.

According to another aspect of the present invention, there is provided a color image processing apparatus, which applies image processing to image data of an input color image, and outputs the processed image data, comprising: an extraction unit that extracts image data on a n-pixel basis (n is an integer not less than 1) in turn from the image data; and a change unit that changes tone values of respective colors of the color image, so that a conversion result obtained when the extracted image data are converted into data of a predetermined unit becomes an amount based on a reference conversion result, the reference conversion result being obtained when the extracted image data are color-converted by a predetermined color conversion method, and the converted data is further converted into data of the predetermined unit.

According to still another aspect of the present invention, there is provided a computer-readable storage medium storing a program for controlling a computer to function as a color image processing apparatus, which applies image processing to image data of an input color image, and outputs the processed image data, the program controlling the computer to function as the color image processing apparatus which comprises: a change unit that changes tone values of respective colors of the color image, so that a conversion result obtained when image data of the color image are converted into amounts of color materials becomes an amount based on a reference conversion result, the reference conversion result being obtained when the image data are color-converted by a predetermined color conversion method and the converted data is further converted into an amount of a color material.

According to yet another aspect of the present invention, there is provided a computer-readable storage medium storing a program for controlling a computer to function as a color image processing apparatus which applies image processing to image data of an input color image, and outputs the processed image data, the program controlling the computer to function as the color image processing apparatus which comprises: an extraction unit that extracts image data for units of n pixels (n is an integer not less than 1) in turn from the image data; and a change unit that changes tone values of respective colors of the color image, so that a conversion result obtained when the extracted image data are converted into data of a predetermined unit becomes an amount based on a reference conversion result, the reference conversion result being obtained when the extracted image data are color-converted by a predetermined color conversion method, and the converted data is further converted into data of the predetermined unit.

According to the present invention, the amount of color materials consumed that are used to form a color image can be reduced with reference to an index with higher utility.

Further features of the present invention will become apparent from the following description of exemplary embodiments (with reference to the attached drawings).

BRIEF DESCRIPTION OF THE DRAWINGS

FIG. 3 is a block diagram showing the system arrangement of the printer 100;

FIGS. 4A and 4B are block diagrams associated with processes in the printer 100 and a host PC 200;

FIG. 6 shows examples of tone value—toner amount tables;

FIG. 16 shows an example of a cost coefficient table;

DESCRIPTION OF THE EMBODIMENTS

Figure 1:
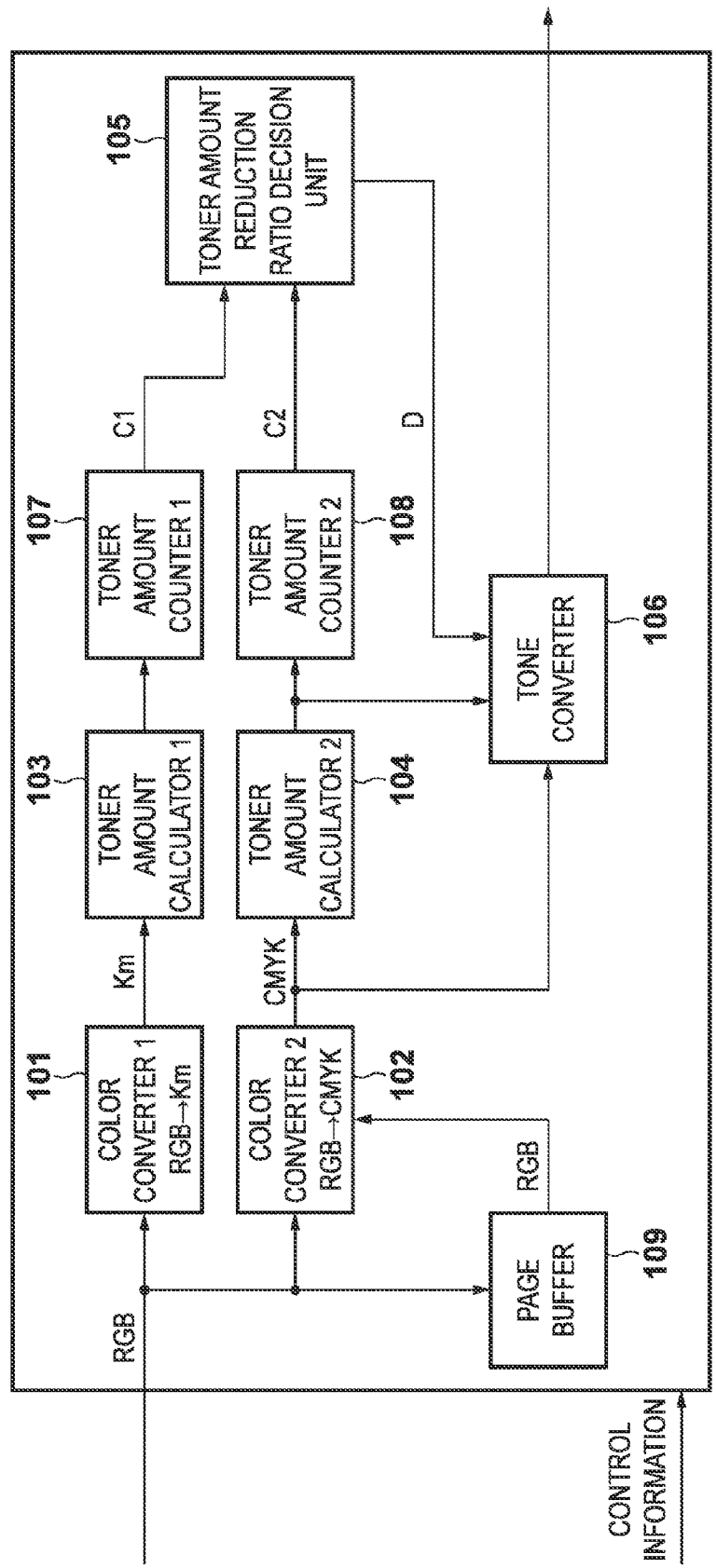
FIG. 1 is a block diagram associated with toner saving processing.

Embodiments for carrying out the present invention will be described hereinafter with reference to the drawings. Note that the following embodiments do not limit the invention according to the scope of the claims, and all of combinations of features described in the embodiments are not always essential to solving means of the invention.

[First Embodiment]

The first embodiment will be described below. This embodiment will explain a tandem type, 4-drum, full-color image forming apparatus which adopts an electrophotography system and an intermediate transfer belt as an application example of a color image processing apparatus of the present invention. Note that the color image processing apparatus of the present invention is also applicable to a host computer (host PC), as will be described later.

<Arrangement of Printer 100>

The arrangement of a color image forming apparatus 100 (to be simply referred to as a printer hereinafter) will be described below with reference to FIG. 2. The printer 100 uses developing materials (toners) of four colors, that is, yellow (Y), magenta (M), cyan (C), and black (K), as color materials of a plurality of colors used to form an image on a recording material (recording medium). The printer 100 includes four image forming stations, which respectively form monochrome toner images on corresponding photosensitive members (photosensitive drums) 22Y, 22M, 22C, and 22K using toners of different colors. The four image forming stations respectively include the plurality of photosensitive members 22Y, 22M, 22C, and 22K, injection chargers 23Y, 23M, 23C, and 23K as primary chargers, and exposure devices 24Y, 24M, 24C, and 24K. The four image forming stations further include toner cartridges 25Y, 25M, 25C, and 25K, and developers 26Y, 26M, 26C, and 26K. The printer 100 includes an intermediate transfer member 27 on which toner images formed on the photosensitive members 22Y, 22M, 22C, and 22K in these four image forming stations are transferred.

Each of the photosensitive members 22Y, 22M, 22C, and 22K is prepared by coating an organic photoconductive layer on the outer surface of an aluminum cylinder, and is rotated by a driving force of a driving motor (not shown). The driving motor rotates each photosensitive member 22 counterclockwise in FIG. 2 according to an image forming operation. The driving force of this driving motor is transmitted to each photosensitive member 22 via a gear attached to a shaft of that driving motor and other gear trains. Note that a single motor or motors different for respective photosensitive members may be used as the driving motor.

The injection chargers 23Y, 23M, 23C, and 23K respectively include sleeves 23YS, 23MS, 23CS, and 23KS, and charge the corresponding photosensitive members 22Y, 22M, 22C, and 22K. The exposure devices 24Y, 24M, 24C, and 24K expose the charged surfaces of the photosensitive members 22Y, 22M, 22C, and 22K with exposure light, thereby forming electrostatic latent images on the corresponding photosensitive members. The developers 26Y, 26M, 26C, and 26K respectively include a plurality of sleeves 26YS, 26MS, 26CS, and 26KS. The developers 26Y, 26M, 26C, and 26K develop the electrostatic latent images on the photosensitive members 22Y, 22M, 22C, and 22K with toners of different colors, thus forming toner images on the corresponding photosensitive members. More specifically, the developers 26Y, 26M, 26C, and 26K visualize the electrostatic latent images by forming monochrome toner images on the photosensitive members 22Y, 22M, 22C, and 22K respectively using Y, M, C, and K toners. Note that the developers 26Y, 26M, 26C, and 26K are detachable from the printer 100.

Figure 2:
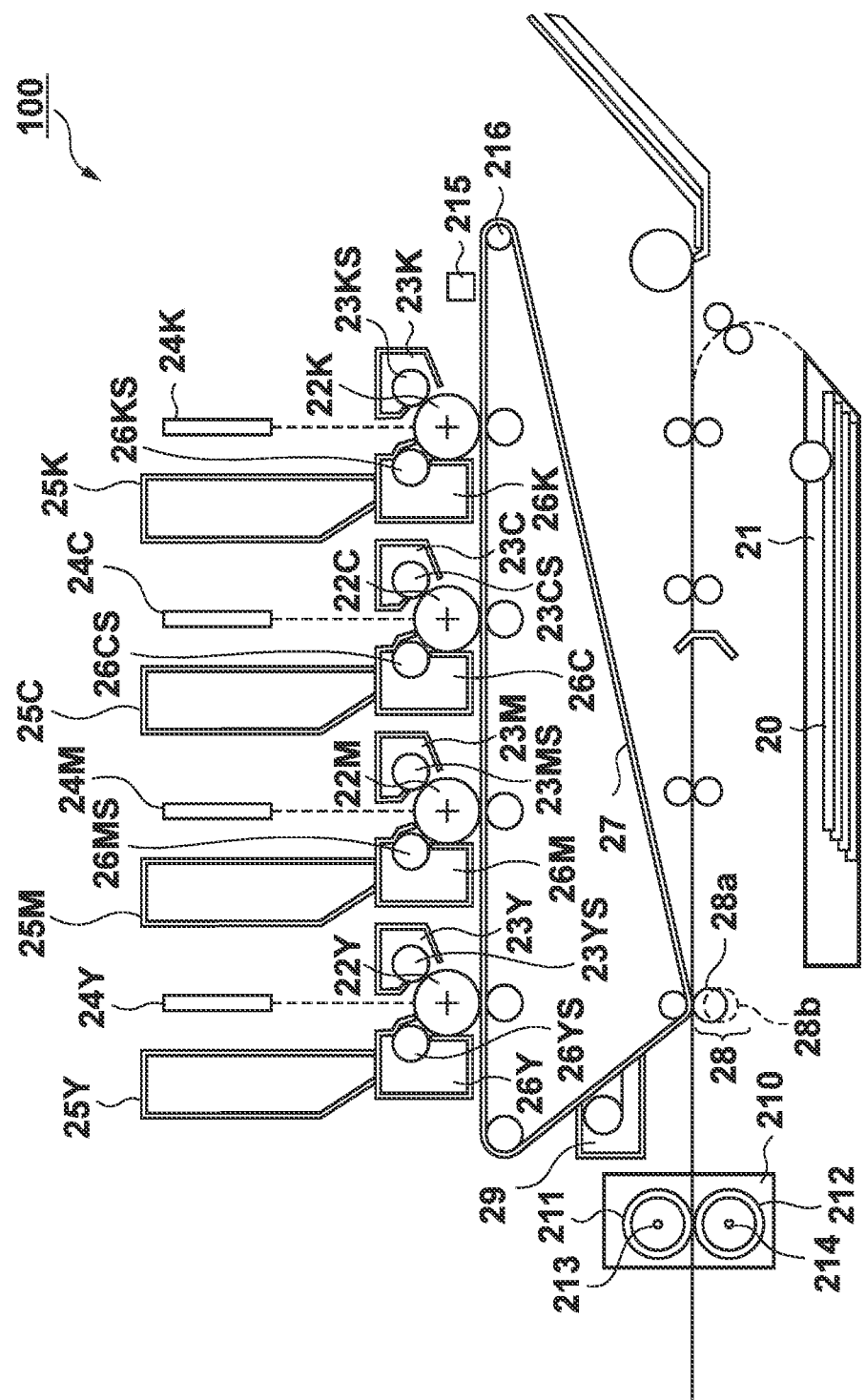
FIG. 2 is a view showing the arrangement of an image forming unit in a printer 100.

The intermediate transfer member 27 is arranged at a position where the member 27 contacts the photosensitive members 22Y, 22M, 22C, and 22K, as shown in FIG. 2. Monochrome toner images are transferred from the photosensitive members 22Y, 22M, 22C, and 22K in turn on the surface of the intermediate transfer member 27 (primary transfer), while the member 27 is rotated clockwise in FIG. 2 by an intermediate transfer member driving roller 216 during image formation. Since the toner images are transferred to be superposed on the intermediate transfer member 27, a multi-color (color) toner image is formed on the intermediate transfer member 27.

The color toner image formed on the intermediate transfer member 27 is conveyed to a position where a transfer roller 28 is arranged upon rotation of the intermediate transfer member. In synchronism with a conveyance timing of the color toner image, a recording material 20 is fed from a paper feed unit (paper cassette) 21. The recording material 20 is conveyed along a conveyance path to a position where the transfer roller 28 is arranged. The transfer roller 28 contacts the intermediate transfer member 27 via the conveyed recording material 20 at a position 28a. While the transfer roller 28 contacts the intermediate transfer member 27, the color toner image formed on the intermediate transfer member 27 is transferred onto the recording material 20 (secondary transfer). Then, the color toner image is formed on the recording material 20. Upon completion of the secondary transfer from the intermediate transfer member 27 onto the recording material 20, the transfer roller 28 moves from the position 28a to a position 28b to be separated from the intermediate transfer member 27.

The recording material 20 on which the color toner image is transferred is then conveyed along the conveyance path to a fixing unit 210. The fixing unit 210 melts the toner image on the recording material 20 conveyed along the conveyance path, thus fixing the toner image on the recording material 20. The fixing unit 210 includes a fixing roller 211 used to heat the recording material 20, and a pressing roller 212 used to bring the recording material 20 to be in pressure-contact with the fixing roller 211. The fixing roller 211 and pressing roller 212 are formed to have a hollow shape, and respectively incorporate heaters 213 and 214. The recording material 20 which holds the color toner image on its surface is applied with a heat and pressure in the fixing unit 210 while being conveyed by the fixing roller 211 and pressing roller 212. As a result, the toner image is fixed on the surface of the recording material 20. After the toner image is fixed, the recording material 20 is discharged onto a discharge tray (not shown) by discharge rollers (not shown). In this way, the image forming operation on the recording material 20 is complete.

A cleaning unit 29 arranged in the vicinity of the intermediate transfer member 27 includes a cleaner container, and recovers toners (residual toners) which remain on the intermediate transfer member 27 after transfer of the toner image onto the recording material 20. The cleaning unit 29 stores the recovered residual toners in the cleaner container. In this manner, the cleaning unit 29 cleans the surface of the intermediate transfer member 27.

In this case, at least the aforementioned image forming stations, paper feed unit 21, intermediate transfer member 27, transfer roller 28, and fixing unit 210 serve as an image forming unit used to form an image on the recording material 20 based on input image data. In the following description, the conveyance direction of the recording material 20 (that is, the moving direction of the circumferential surface of the intermediate transfer member 27) will be simply referred to as "conveyance direction" or "sub-scanning direction", and a direction perpendicular to the sub-scanning direction will be referred to as "main scanning direction".

<System Arrangement of Printer 100>

Processing to be executed at the time of image formation will be described below with reference to the system arrangement of the printer 100 shown in FIG. 3. A host PC 200 includes at least a CPU 201, RAM 202, network interface (IF) 203, display unit IF 204, input IF 205, and hard disk drive (HDD) 206 as an example of a nonvolatile storage device. The CPU 201 controls the operation of the overall host PC 200 using the RAM 202 as a main memory and work area by reading out various control programs stored in the HDD 206 onto the RAM 202 and executing these programs. The HDD 206 also stores various applications and printer drivers. The CPU 201 can execute these applications and drivers by reading them out onto the RAM 202. The network IF 203 is connected to a network such as a LAN, and the host PC 200 is connected to the printer 100 via such network. Note that the host PC 200 may be directly connected to the printer 100 by a connection method such as USB connection without the intervention of any network.

The host PC 200 sends PDL (Page Description Language) job data to the printer 100 via the network IF 203 using such application or printer driver. The PDL job data (print job data) includes drawing data as image data of an image to be formed, and control data required to control an image forming operation using the drawing data. The display unit IF 204 is an interface used to make various displays on a display unit (not shown) such as a liquid crystal display. The input IF 205 is an interface used to accept inputs from input devices such as a keyboard and mouse.

The printer 100 roughly includes an engine control unit 320 and engine mechanism unit 330. The engine mechanism unit 330 operates according to various instructions from the engine control unit 320. The engine mechanism unit 330 includes a sensor system 309, paper feed/conveyance system 310, image forming system 311, and laser scanner system 312. The laser scanner system 312 is configured by the exposure devices 24Y, 24M, 24C, and 24K, and includes, for example, laser-emitting elements, laser driver circuits, scanner motors, rotary polyhedral mirrors, and scanner drivers. The laser scanner system 312 exposes and scans the surfaces of the photosensitive members 22Y, 22M, 22C, and 22K with laser light according to drawing data sent from an ASIC 308, thereby forming electrostatic latent images on the photosensitive members.

The image forming system 311 forms a toner image on a recording medium based on the electrostatic latent images formed on the photosensitive members 22Y, 22M, 22C, and 22K by the laser scanner system 312. The image forming system 311 includes process elements such as the toner cartridges 25Y, 25M, 25C, and 25K, intermediate transfer member 27, and fixing unit 210, and a high-voltage power supply circuit which generates various biases (high voltages) at the time of image formation. The image forming system 311 further includes, for example, dischargers, the injection chargers 23Y, 23M, 23C, and 23K, the developers 26Y, 26M, 26C, and 26K, and photosensitive members 22Y, 22M, 22C, and 22K. The toner cartridges 25Y, 25M, 25C, and 25K include nonvolatile memory tags. A CPU 303 or the ASIC 308 reads/writes various kinds of information from/in the memory tags. The paper feed/conveyance system 310 includes, for example, various conveyance system motors, the paper feed unit 21, the discharge tray, and various conveyance rollers, and feeds and conveys a recording medium.

The sensor system 309 includes a sensor group including a plurality of sensors. The respective sensors included in the sensor group collect information required for the CPU 303 and ASIC 308 to control the laser scanner system 312, image forming system 311, and paper feed/conveyance system 310. The sensor group includes a temperature sensor of the fixing unit 210, a toner remaining amount detection sensor, a density sensor used to detect an image density, a paper size sensor used to detect a paper size, a sheet edge sensor used to detect the leading end of a recording medium, a sheet conveyance detection sensor, and the like. Information detected by these sensors is sent to the CPU 303, and is used in print sequence control. Note that the aforementioned sensors may be included in any of the laser scanner system 312, image forming system 311, and paper feed/conveyance system 310 in place of the sensor system 309.

The engine control unit 320 controls the aforementioned engine mechanism unit 330. In the engine control unit 320, the CPU 303 uses a RAM 305 as a main memory and work area. The CPU 303 controls the engine mechanism unit 330 by reading out various control programs stored in a ROM 304 onto the RAM 305, and executing the readout programs. A system bus 314 has an address bus and data bus. Since respective components in the engine control unit 320 are connected to the system bus 314, they can access other components via the system bus 314.

A host interface (IF) 306 is an interface used to exchange drawing data and control data with the host PC 200. Drawing data which is received by the host IF 306 as compressed data is stored in the RAM 305. The CPU 303 decompresses the compressed data received by the host IF 306 to drawing data, and stores that drawing data in the RAM 305. A DMA controller 307 transfers the drawing data in the RAM 305 to the ASIC 308 in accordance with an instruction from the CPU 303. A panel IF 313 is an interface used to receive, from a display panel unit arranged on a printer main body, settings and instructions input by the user using the display panel unit.

The CPU 303 and ASIC 308 drive the laser scanner system 312 in the engine mechanism unit 330 based on control data and drawing data input via the host IF 306. The CPU 303 controls the image forming system 311 and paper feed/conveyance system 310 to execute various print sequences. Also, the CPU 303 drives the sensor system 309 to obtain sensor information required to control the image forming system 311 and paper feed/conveyance system 310.

The ASIC 308 executes high-voltage power supply control of control biases of respective motors, developing biases, and the like in accordance with an instruction from the CPU 303 upon execution of various print sequences described above. Also, the ASIC 308 executes toner saving processing, gamma correction processing, halftone processing, PWM processing, and the like (to be described later). Note that some or all of functions of the CPU 303 may be executed by the ASIC 308, or conversely, some or all of functions of the ASIC 308 may be executed by the CPU 303. Also, the printer 100 may include another dedicated hardware, which may execute some of functions of the CPU 303 and ASIC 308.

<Processing in Printer 100 and Host PC 200>

Processes to be executed by the host PC 200, and the CPU 303, ASIC 308, and laser scanner system 312 in the printer 100 will be described below with reference to FIG. 4A.

When an application 401 such as document creation software or graphic drawing software, which is running on the host PC 200, generates drawing data and control data for printing, it sends them to a PDL converter 402 on a printer driver. The drawing data includes, for example, tone values and attribute information of an image to be printed. The attribute information is required to identify, for example, an image type (text data, graphics data, and image data). The control data includes, for example, a size setting of a recording material used in printing, the number of copies to be printed, a setting about permission/inhibition of toner saving processing (to be described later), and a toner saving parameter. The PDL converter 402 converts the drawing data into compressed data to generate PDL data including the converted data and control data, and sends the generated PDL data to the printer 100.

In the printer 100, the CPU 303 receives the PDL data sent from the host PC 200 via the host IF 306. The CPU 303 applies predetermined processing to the received PDL data, and then temporarily stores the processed data in the RAM 305. More specifically, a renderer 403 executed by the CPU 303 decompresses the compressed data included in the received PDL data into drawing data, and stores it in the RAM 305. In this embodiment, tone values in the drawing data are RGB data expressed on an RGB color space.

The drawing data stored in the RAM 305 is sent to the ASIC 308 under the control of the DMA controller 307. The CPU 303 sends the control data in the PDL data to the ASIC 308. Also, the CPU 303 extracts control information required for processing to be executed by the ASIC 308 from the ROM 304, and sends that information to the ASIC 308. Note that the control information stored in the ROM 304 includes, for example, a color conversion table, tone value—toner amount tables, gamma correction table, and halftone table.

The control information received by the ASIC 308 is supplied to a toner saving processor 406, gamma correction unit 407, and halftone processor 408. The drawing data (tone values R, G, and B expressed on the RGB color space) received from the ASIC 308 is supplied to the toner saving processor 406 as an input signal. The toner saving processor 406 executes, for the input signal, toner saving processing required to reduce use amounts of toners as color materials used upon execution of printing based on the input signal. The toner saving processor 406 converts tone values R, G, and B as the input signal into tone values expressed on a CMYK color space, and executes the toner saving processing for the converted tone values. Furthermore, the toner saving processor 406 outputs tone values C', M', Y', and K' after the toner saving processing to the gamma correction unit 407.

The gamma correction unit 407 corrects tone—density characteristics of the tone values C', M', Y', and K' using a gamma correction table, which is included in the control information and is required to correct tone—density characteristics of the printer, to generate tone values C", M", Y", and K". The generated tone values are output to the halftone processor 408. The halftone processor 408 executes halftone processing based on known dithering using a halftone table included in the control information, thereby converting the tone values C", M", Y", and K" into tone values $C_h$", $M_h$", $Y_h$", and $K_h$" after the halftone processing. The converted tone values are output to a PWM processor 409. The PWM processor 409 converts the tone values $C_h$", $M_h$", $Y_h$", and $K_h$" into exposure times Tc, Tm, Ty, and Tk of laser-emitting elements of the exposure devices 24Y, 24M, 24C, and 24K. The PWM processor 409 outputs the exposure times Tc, Tm, Ty, and Tk to the exposure devices 24Y, 24M, 24C, and 24K as image data (PWM data) for exposure. The exposure devices 24Y, 24M, 24C, and 24K control the laser-emitting elements to emit light according to the exposure times Tc, Tm, Ty, and Tk.

Each tone value on the RGB color space and CMYK color space can be expressed by the arbitrary number of bits and, for example, 8 bits. However, in order to adjust, for example, the color gamut of the printer 100, the number of bits of each tone value can be increased/decreased. The processing in the ASIC 308 described above with reference to FIG. 4A may be executed on the host PC 200 side, as shown in FIG. 4B. In this case, for example, software required to implement the functions executed by the ASIC 308 in FIG. 4A above may be stored in advance in the HDD 206 of the host PC 200, and the CPU 201 may read out that software onto the RAM 202 and may execute the readout software. Also, control information including various tables such as a color conversion table may be stored in advance in the HDD 206, and the CPU 201 may read out that control information from the HDD 206 when the information is used. Referring to FIG. 4B, a PDL converter 410 has a function of converting tone values $C_h$", $M_h$", $Y_h$", and $K_h$" after halftone processing by the halftone processor 408 into PDL data to have these tone values as drawing data. The PDL data is sent to the printer 100. In the printer 100, a renderer 411 converts the PDL data received from the host PC 200 into original tone values $C_h$", $M_h$", $Y_h$", and $K_h$", and outputs them to the PWM processor 409.

<Arrangement of Toner Saving Processor 406>

The block arrangement of the toner saving processor 406 and the toner saving processing to be executed by the toner saving processor 406 will be described below with reference to FIG. 1. Tone values R, G, and B on the RGB color space, which are input to the toner saving processor 406, are input to a first color converter 101 and second color converter 102, and are stored in a page buffer 109. The page buffer 109 holds sequentially input tone values R, G, and B for one page.

The first color converter 101 converts the input tone values R, G, and B into a tone value Km expressed by a monochrome tone value using a predetermined calculation, and outputs the conversion result to a first toner amount calculator 103. The second color converter 102 converts the input tone values R, G, and B into corresponding tone values C, M, Y, and K on the CMYK color space using a color conversion table which holds information required to convert a color space from the RGB color space into the CMYK color space. Note that this color conversion table is extracted from the control information input to the toner saving processor 406. The second color converter 102 outputs the conversion results to a second toner amount calculator 104 and tone converter 106.

The first toner amount calculator 103 calculates a toner amount (amount of a color material) Akm, which is consumed to form an image using the tone value Km, with reference to a tone value—toner amount conversion table, and outputs the calculation result to a first toner amount counter 107. On the other hand, the second toner amount calculator 104 calculates toner amounts (amounts of color materials) Ac, Am, Ay, and Ak of respective colors, which are consumed to form an image using the tone values C, M, Y, and K, with reference to tone value—toner amount tables for respective colors. The calculation results are output to a second toner amount counter 108 and the tone converter 106. Note that the tone value—toner amount conversion tables used in these first and second toner amount calculators 103 and 104 are extracted from the control information input to the toner saving processor 406.

The first toner amount counter 107 adds the input toner amount Akm for one pixel to a corresponding counter value C1. The second toner amount counter 108 adds a sum total (Ac+Am+Ay+Ak) of the input toner amounts Ac, Am, Ay, and Ak of respective colors for one pixel to a corresponding counter value C2. The first and second toner amount counters 107 and 108 repeat the toner amount addition processing for all pixels for one page. As a result, the counter values C1 and C2 allow to measure toner amounts consumed to form an input image for one page. These counter values C1 and C2 are input to a toner amount reduction ratio decision unit 105.

The toner amount reduction ratio decision unit 105 decides a toner amount reduction ratio D (first reduction ratio) used to reduce the toner amounts Ac, Am, Ay, and Ak of the color image using the toner amounts for one page, which are indicated by the counter values C1 and C2, and a toner saving parameter S. More specifically, the toner amount reduction ratio decision unit 105 decides a toner amount reduction ratio D used to reduce the toner amounts Ac, Am, Ay, and Ak corresponding to the color image with reference to the toner amount Akm corresponding to a monochrome image. The toner amount reduction ratio decision unit 105 outputs the decided ratio D to the tone converter 106. The toner saving parameter S is extracted from the control information input to the toner saving processor 406. The tone converter 106 outputs tone values C', M', Y', and K' after the toner saving processing using the toner amount reduction ratio D, the toner amounts Akm, Ac, Am, Ay, and Ak, and tone value—toner amount tables extracted from the control information. Also, the tone converter 106 changes the tone values C, M, Y, and K of the color image according to the toner amount reduction ratio D, so as to obtain the tone values C', M', Y', and K' required to form a color image on a recording material.

<Sequence of Toner Saving Processing>

Figure 7A:
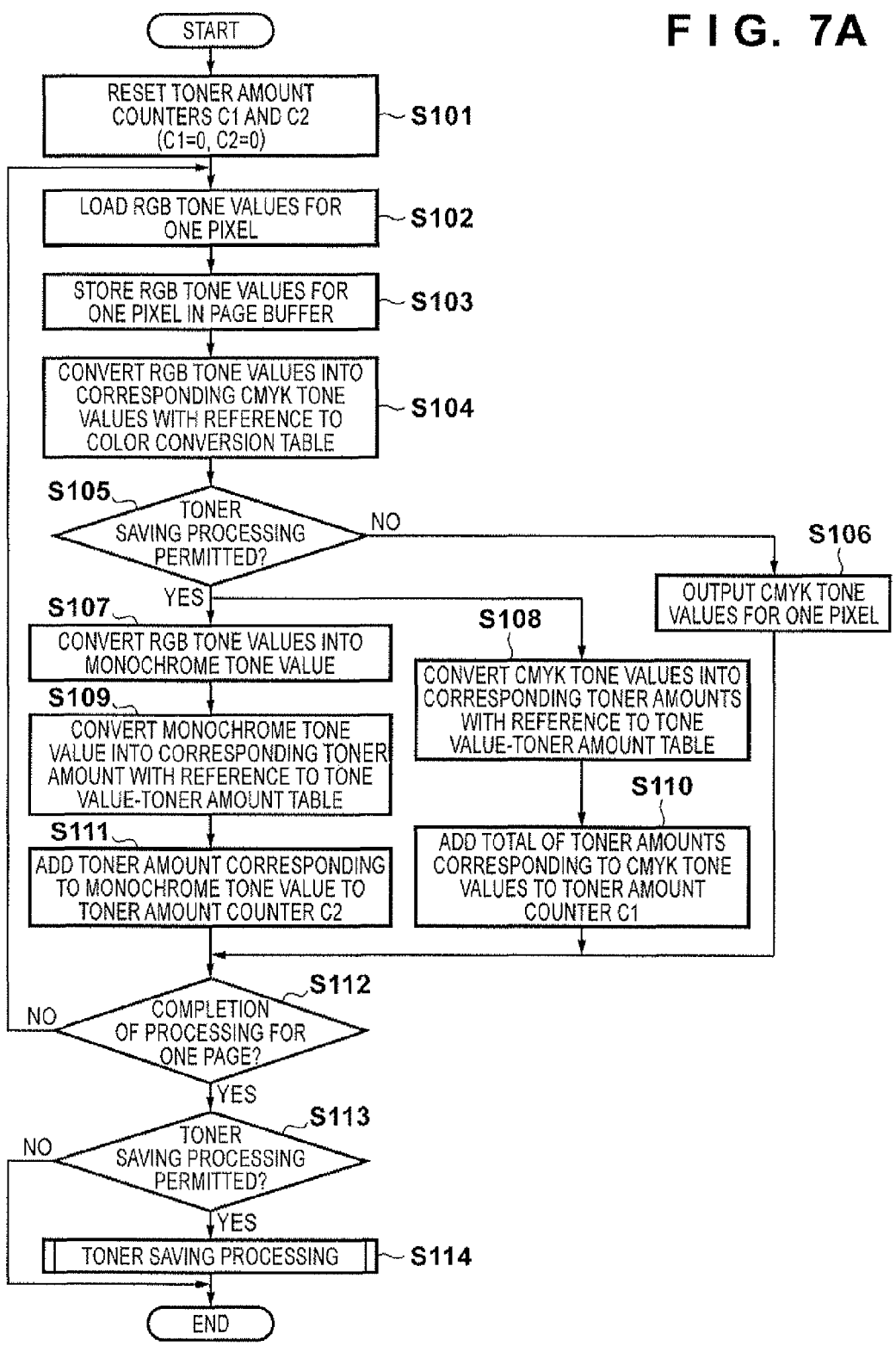
FIGS. 7A and 7B are flowcharts showing the sequence of toner saving processing.
Figure 7B:
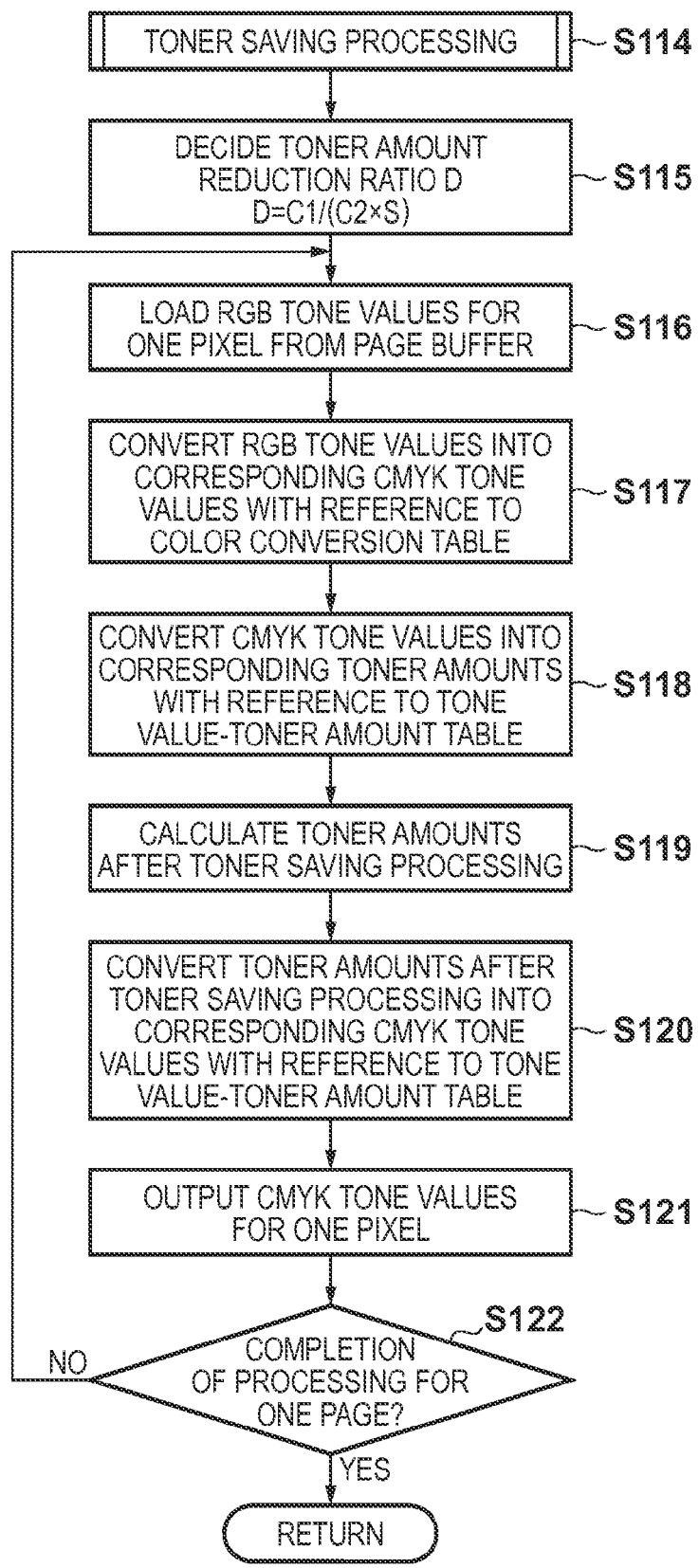

The sequence of the aforementioned toner saving processing to be executed by the toner saving processor 406 of the ASIC 308 will be described below with reference to FIGS. 7A and 7B. FIGS. 7A and 7B are flowcharts showing the sequence of the toner saving processing according to this embodiment. When the toner saving processing is started, the toner saving processor 406 resets the counter value C1 in the first toner amount counter 107 and the counter value C2 in the second toner amount counter 108 to zero in step S101. The toner saving processor 406 controls the first and second color converters 101 and 102 to load tone values R, G, and B for one pixel from the drawing data in step S102, and stores the tone values R, G, and B for one pixel in the page buffer 109 in step S103.

Figure 5:
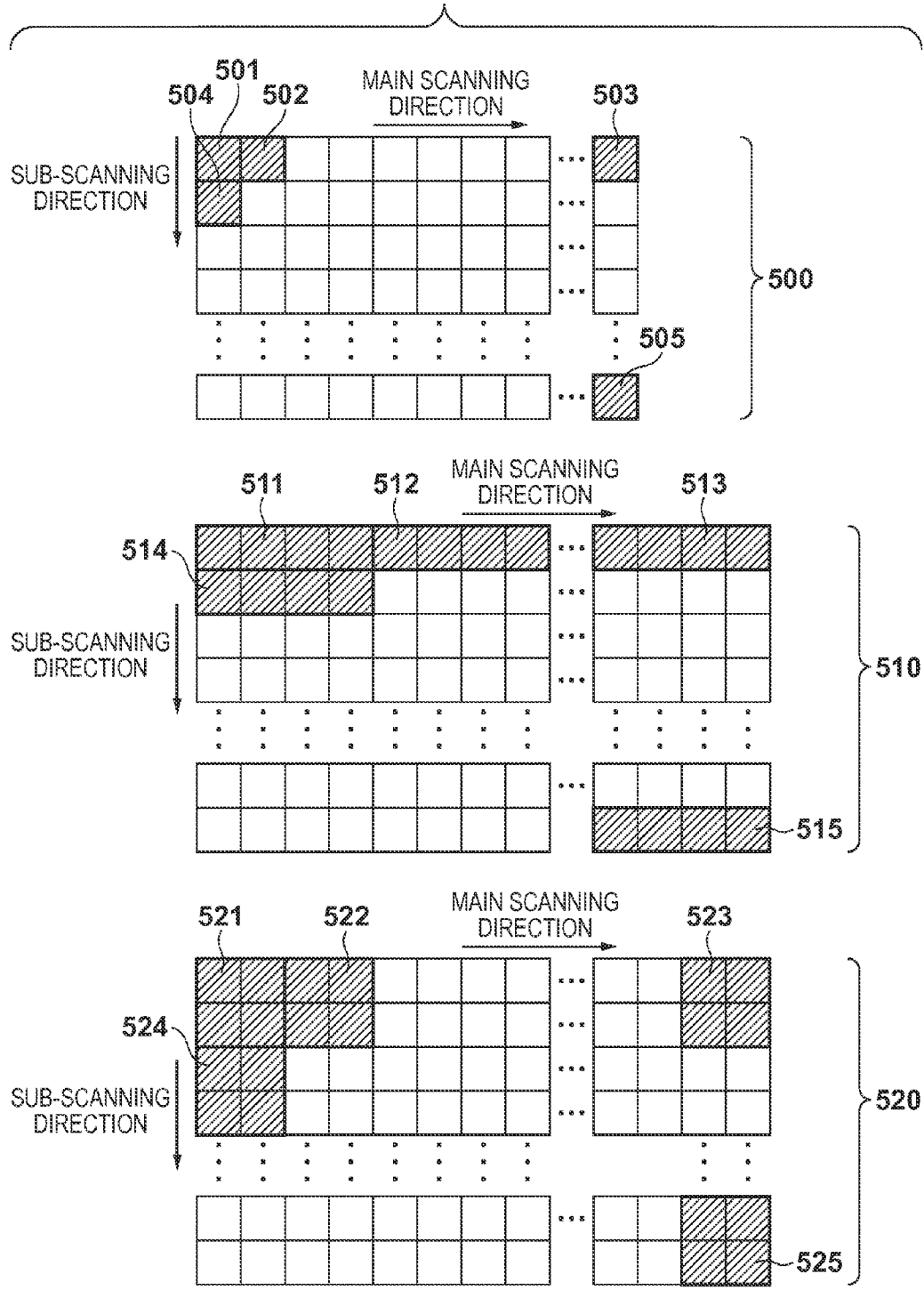
FIG. 5 is a view showing loading states of tone values of pixels from raster data.

In this case, reference numeral 500 in FIG. 5 denotes an example of a raster image of the drawing data. As shown in FIG. 5, the raster image includes pixels of the predetermined numbers in the main scanning direction and sub-scanning direction. The first and second color converters 101 and 102 load tone values of a pixel 501 first, and these tone values are stored in the page buffer 109 at the same time. After that, the toner saving processor 406 advances the process to step S104.

In step S104, the toner saving processor 406 controls the second color converter 102 to convert the tone values R, G, and B for one pixel into tone values C, M, Y, and K on the CMYK color space with reference to a color conversion table. This color conversion table is used to decide tone values on the CMYK color space, which can express a color expressed on the RGB color space, and a table suited to the color characteristics of the printer 100 is prepared in advance.

The toner saving processor 406 determines in step S105 with reference to a setting about permission/inhibition of toner saving processing included in the control information whether or not the toner saving processing is permitted. If the toner saving processor 406 determines that the toner saving processing is not permitted, the process advances to step S106, and the toner saving processor 406 controls the tone converter 106 to output the tone values C, M, Y, and K for one pixel, which do not undergo any toner saving processing, intact. After that, the toner saving processor 406 advances the process to step S112. On the other hand, if the toner saving processor 406 determines in step S105 that the toner saving processing is permitted, the process advances to steps S107 and S108.

In step S107, the toner saving processor 406 controls the first color converter 101 to convert the tone values R, G, and B into a tone value Km using:

$$Km = 255 - (0.299R + 0.587G + 0.114B) \quad (1)$$

This tone value Km corresponds to a grayscale value. In this case, the tone value Km represents white when Km=0, and represents black as a maximum tone when Km=255. The tone value Km represents halftone black according to a value when Km=1 to 254. This tone value Km is a monochrome tone value, and drawing data expressed by Km corresponds to a monochrome image. That is, in step S107, tone values R, G, and B for an input color image are converted into a monochrome tone value Km when the color image is formed as a monochrome image. Note that a calculation formula used to calculate the monochrome tone value Km is not limited to equation (1). For example, a calculation formula Km=255−(R+G+B)/3 may be used.

In steps S108 and S109, toner amounts consumed to form each pixel at densities corresponding to the respective tone values are calculated. In step S108, the toner saving processor 406 controls the second toner amount calculator 104 to convert the tone values C, M, Y, and K into corresponding toner amounts Ac, Am, Ay, and Ak with reference to tone value—toner amount tables. FIG. 6 shows examples of the tone value—toner amount tables for respective colors. Each tone value—toner amount table shows the relationship between a tone value of each color and a toner amount consumed to form an image for one pixel at a density corresponding to the tone value. Tables 600a to 600d in FIG. 6 respectively correspond to C, M, Y, and K colors. According to the correspondence relationships shown in FIG. 6, for example, tone values C, M, Y, and K of the C, M, Y, and K colors are converted into corresponding toner amounts Ac, Am, Ay, and Ak, as denoted by reference numerals 601, 602, 603, and 604.

In step S109, the toner saving processor 406 controls the first toner amount calculator 103 to convert the tone value Km into a corresponding toner amount Akm with reference to a K tone value—toner amount table. In this case, the tone value Km corresponds to that required to form a monochrome image using the K color. For this reason, the tone value—toner amount table used in step S109 is the table 600d shown in FIG. 6, and the tone value Km is converted into the toner amount Akm, as denoted by reference numeral 609. With the processing in step S109, the toner amount Akm consumed to form a monochrome image is calculated for the pixel loaded in step S101 of a plurality of pixels included in the input color image. After steps S108 and S109, the process advances to steps S110 and S111.

In step S110, the toner saving processor 406 controls the toner amount counter 107 to add a sum total (Ac+Am+Ay+Ak) of the toner amounts of the respective colors for one pixel to the counter value C1. On the other hand, in step S111, the toner saving processor 406 controls the toner amount counter 108 to add the toner amount Akm for one pixel of a monochrome image to the counter value C2. With these processes, the toner amount consumed for one pixel of the input color image is added to the counter value C1. Also, the toner amount consumed to form that pixel as a monochrome pixel is added to the counter value C2. After steps S110 and S111, the process advances to step S112.

The toner saving processor 406 determines in step S112 whether or not the processes in steps S102 to S111 are complete for pixels for one page. If the toner saving processor 406 determines that the processes are not complete yet for pixels for one page, the process returns to step S102. In step S102, when the processes are complete for the pixel 501 in the raster image 500 shown in FIG. 5, the toner saving processor 406 executes the processes in step S102 and subsequent steps for a next pixel 502 in the main scanning direction. When the processes are complete for tone values of a last pixel 503 in the main scanning direction of one line including the pixels 501 and 502, the toner saving processor 406 starts processing for a first pixel 504 included in a next line in the sub-scanning direction. On the other hand, if the toner saving processor 406 determines in step S112 that the processes are complete for all pixels for one page (that is, if it determines that the processes are complete for a pixel 505 at a page end in the raster image 500 shown in FIG. 5), the process advances to step S113.

As described above, when the processes are complete for pixels for one page in step S112, the counter value C1 holds the toner amount consumed to form the input color image for one page. Also, the counter value C2 holds the toner amount consumed to form the input color image for one page as a monochrome image. In step S113 and subsequent steps, a toner amount reduction ratio D is decided based on these counter values C1 and C2. The toner saving processor 406 determines in step S113 whether or not the toner saving processing is permitted, as in step S105. If the toner saving processor 406 determines that the toner saving processing is not permitted, the processing ends without any toner saving processing. On the other hand, if the toner saving processor 406 determines that the toner saving processing is permitted, the process advances to step S114 to execute the toner saving processing.

In step S114, processes in steps S115 to S122 shown in FIG. 7B are executed. In step S115, the toner saving processor 406 controls the toner amount reduction ratio decision unit 105 to decide a toner amount reduction ratio D using:

$$D = C1/(C2 \times S) \tag{2}$$

where a coefficient S is a toner saving parameter included in the control information, and is a parameter used as an adjustment ratio for adjusting the total toner amount after the toner saving processing. The toner saving parameter S is an adjustment ratio which is set in advance to define a ratio with respect to a toner consumption amount when a color image is formed as a monochrome image, and a parameter which specifies a toner consumption amount to be reduced by the toner saving processing. In this case, equation (2) is modified to C1/D=(C2×S). This indicates that when a toner amount consumed to form an input color image for one page is multiplied by (1/D), the toner amount is (C2×S). (C2×S) represents a target toner amount (target value) for the sum total of toner consumption amounts of all the colors for one page after the toner saving processing.

For example, when S=1, the toner consumption amount for one page when an image is formed using tone data after the toner saving processing is equal to that for one page when an input color image is formed as a monochrome image. When S=0.8, the toner consumption amount for one page when an image is formed using tone data after the toner saving processing is adjusted to 80% of that for one page when an input color image is formed as a monochrome image. In this way, by adjusting the toner saving parameter S, the toner amount to be reduced by the toner saving processing can be adjusted.

In step S116, the toner saving processor 406 loads tone values R, G, and B for one pixel from the page buffer 109 which stores the tone values of pixels for one page. Note that the loading order of tone values can be the same as that in step S102. In step S117, the toner saving processor 406 converts the tone values R, G, and B for one pixel into tone values C, M, Y, and K on the CMYK color space, as in step S104. Furthermore, in step S118, the toner saving processor 406 converts the tone values C, M, Y, and K into corresponding toner amounts Ac, Am, Ay, and Ak with reference to the tone value—toner amount tables as in step S108.

In step S119, the toner saving processor 406 controls the tone converter 106 to calculate toner amounts Ac', Am', Ay', and Ak' after the toner saving processing by substituting the toner amount reduction ratio D decided in step S115 in:

$$Ac'=Ac/D, Am'=Am/D$$

$$Ay'=Ay/D, Ak'=Ak/D \tag{3}$$

Using equations (3), the sum total (Ac'+Am'+Ay'+Ak') of the toner amounts of all the colors after the toner saving processing can be reduced to (1/D) of the sum total (Ac+Am+Ay+Ak) of the original toner amounts.

In step S120, the toner saving processor 406 controls the tone converter 106 to convert the toner amounts Ac', Am', Ay', and Ak' after the toner saving processing into corresponding tone values C', M', Y', and K' with reference to the tone value—toner amount tables. The processing in step S120 is implemented by processing for calculating the corresponding tone values C', M', Y', and K' from the toner amounts Ac', Am', Ay', and Ak' of the respective colors, as denoted by reference numerals 605, 606, 607, and 608 in FIG. 6. After that, the toner saving processor 406 controls the tone converter 106 to output the tone values C', M', Y', and K' for one pixel in step S121, and the process advances to step S122.

The toner saving processor 406 determines in step S122 whether or not the processes in steps S116 to S121 are complete for pixels for one page. If the toner saving processor 406 determines that the processes are not complete yet for pixels for one page, the process returns to step S116 to execute the processes in steps S116 to S121 for the next pixel. If the toner saving processor 406 determines in step S122 that the processes are complete for all the pixels for one page (that is, if it determines that the processes are complete for the pixel 505 at the page end in the raster image 500 shown in FIG. 5), the processing ends. Note that if it is determined in steps S105 and S113 that the toner saving processing is not permitted, tone values C, M, Y, and K of respective pixels which do not undergo the toner saving processing are output from the tone converter 106 in turn.

As described above, with the toner saving processing according to this embodiment, the toner consumption amount required to form an image for each pixel is reduced to (1/D) compared to that before the toner saving processing. Furthermore, when the aforementioned toner saving processing is repeated for all the pixels for one page, the toner amount consumed to form an input color image for one image is reduced to (1/D).

After completion of the toner saving processing, based on the tone values C', M', Y', and K' for respective pixels after the toner saving processing output from the toner saving processor 406, the gamma correction processing, halftone processing, and PWM processing are executed, as described above. Then, image data (PWM data) for exposure are supplied to the exposure devices 24Y, 24M, 24C, and 24K. The exposure devices 24Y, 24M, 24C, and 24K expose the corresponding photosensitive members 22Y, 22M, 22C, and 22K according to the image data. The subsequent image forming processing on a recording medium is as has been described above.

As described above, according to this embodiment, the toner amount reduction ratio is decided with reference to a toner amount consumed to form a color image as a monochrome image, and the toner amounts required to form the color image are adjusted according to the decided reduction ratio. That is, toner amounts for each pixel are adjusted at the reduction ratio at which the toner consumption amount for one page after the toner saving processing becomes the target toner amount (C2×S), and a color image is formed using tone values corresponding to the adjusted toner amounts. In this way, the toner amounts required to form an input color image can be adjusted with reference to the toner amount required to form the input color image as a monochrome image. As a result, the toner consumption amounts can be reduced with reference to an index with high utility, that is, the toner amount required to form an input color image as a monochrome image, which is easily understood by the user, thus improving the usability of the user. Full-color print processing uses toners (color materials) of a plurality of colors, and an image is formed using color materials of large amounts. By contrast, monochrome print processing is well known to the user as a resource saving print method. In the above description, the amount of color materials consumed that are reduced with reference to the consumption amount of a color material at the time of this monochrome print processing, and a secondary effect that promotes use of a resource saving mode can also be expected.

Since the toner amounts are adjusted with reference to the toner amount consumed to form an input color image as a monochrome image, especially when an image including only the K color is formed, the same quality as that of an original image can be maintained even when the toner saving processing is executed.

[Second Embodiment]

In the first embodiment, a toner amount reduction ratio D is decided using toner amounts consumed to form an image for one page, and toner saving processing is executed using it. In this case, a page buffer 109 is required to hold tone values of pixels for one page. Also, in order to execute the toner saving processing, image data for one page has to be buffered, and a time period required until image formation is started may be prolonged depending on image data.

Hence, in this embodiment, in order to shorten a time period required until image formation is started after the tone saving processing, the toner saving processing is executed for units of n pixels (n is an integer equal to or larger than 1) in place of one page. Note that differences from the first embodiment will be mainly explained hereinafter for the sake of simplicity.

<Arrangement of Toner Saving Processor 406>

Figure 8:
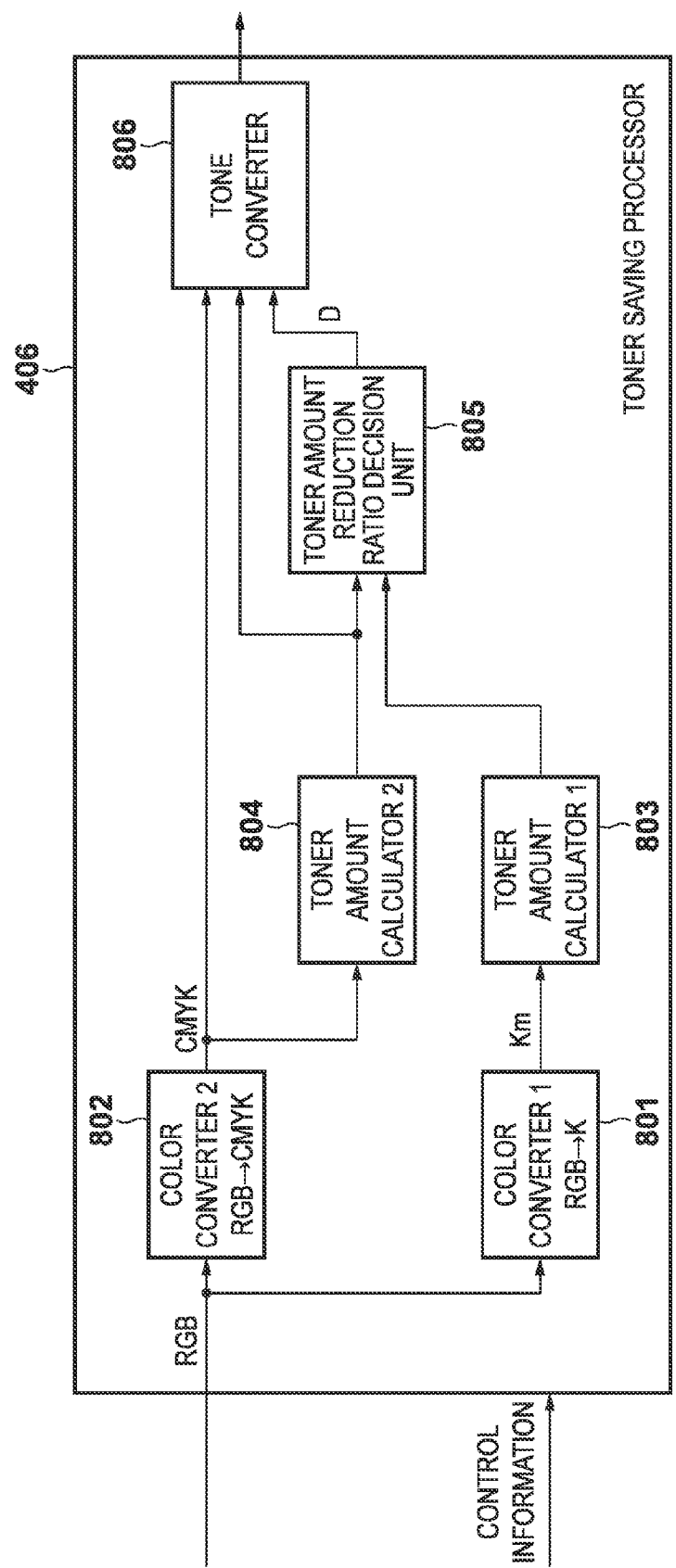
FIG. 8 is a block diagram associated with toner saving processing.

The block arrangement of a toner saving processor 406 and the toner saving processing to be executed by the toner saving processor 406 will be described below with reference to FIG. 8. Tone values R, G, and B input to the toner saving processor 406 are input to a first color converter 801 and second color converter 802. The first color converter 801 converts the input tone values R, G, and B into a tone value Km expressed by a monochrome tone value using a predetermined calculation, and outputs the conversion result to a first toner amount calculator 803. The second color converter 802 converts the input tone values R, G, and B into corresponding tone values C, M, Y, and K on a CMYK color space using a color conversion table, which holds information required to convert a color space from an RGB color space into the CMYK color space. Note that the color conversion table is extracted from control information input to the toner saving processor 406. The second color converter 802 outputs the conversion results to a second toner amount calculator 804 and tone converter 806.

The first toner amount calculator 803 calculates a toner amount (amount of a color material) Akm consumed to form an image using the tone value Km with reference to a tone value—toner amount conversion table, and outputs the calculation result to a toner amount reduction ratio decision unit 805. On the other hand, the second toner amount calculator 804 calculates toner amounts (amounts of color materials) Ac, Am, Ay, and Ak consumed to form an image using the tone values C, M, Y, and K with reference to tone value—toner amount tables for respective colors. The calculation results are output to the toner amount reduction ratio decision unit 805 and tone converter 806. Note that the tone value—toner amount conversion tables used in these first and second toner amount calculators 803 and 804 are extracted from the control information input to the toner saving processor 406.

The toner amount reduction ratio decision unit 805 decides a toner amount reduction ratio D (first reduction ratio) required to reduce the toner amounts Ac, Am, Ay, and Ak of a color image using the toner amounts Akm, Ac, Am, Ay, and Ak, and a toner saving parameter S. More specifically, the toner amount reduction ratio decision unit 805 decides the toner amount reduction ratio D required to reduce the toner amounts Ac, Am, Ay, and Ak corresponding to the color image with reference to the toner amount Akm corresponding to a monochrome image. The toner amount reduction ratio decision unit 805 outputs the decided ratio D to the tone converter 806. The toner saving parameter S is extracted from the control information input to the toner saving processor 406. The tone converter 806 outputs tone values C', M', Y', and K' after the toner saving processing using the toner amount reduction ratio D, the toner amounts Akm, Ac, Am, Ay, and Ak, and the tone value—toner amount conversion tables extracted from the control information. The tone converter 806 changes the tone values C, M, Y, and K of the color image according to the toner amount reduction ratio D so as to obtain the tone values C', M', Y', and K' required to form the color image on a recording material.

<Sequence of Toner Saving Processing>

Figure 9:
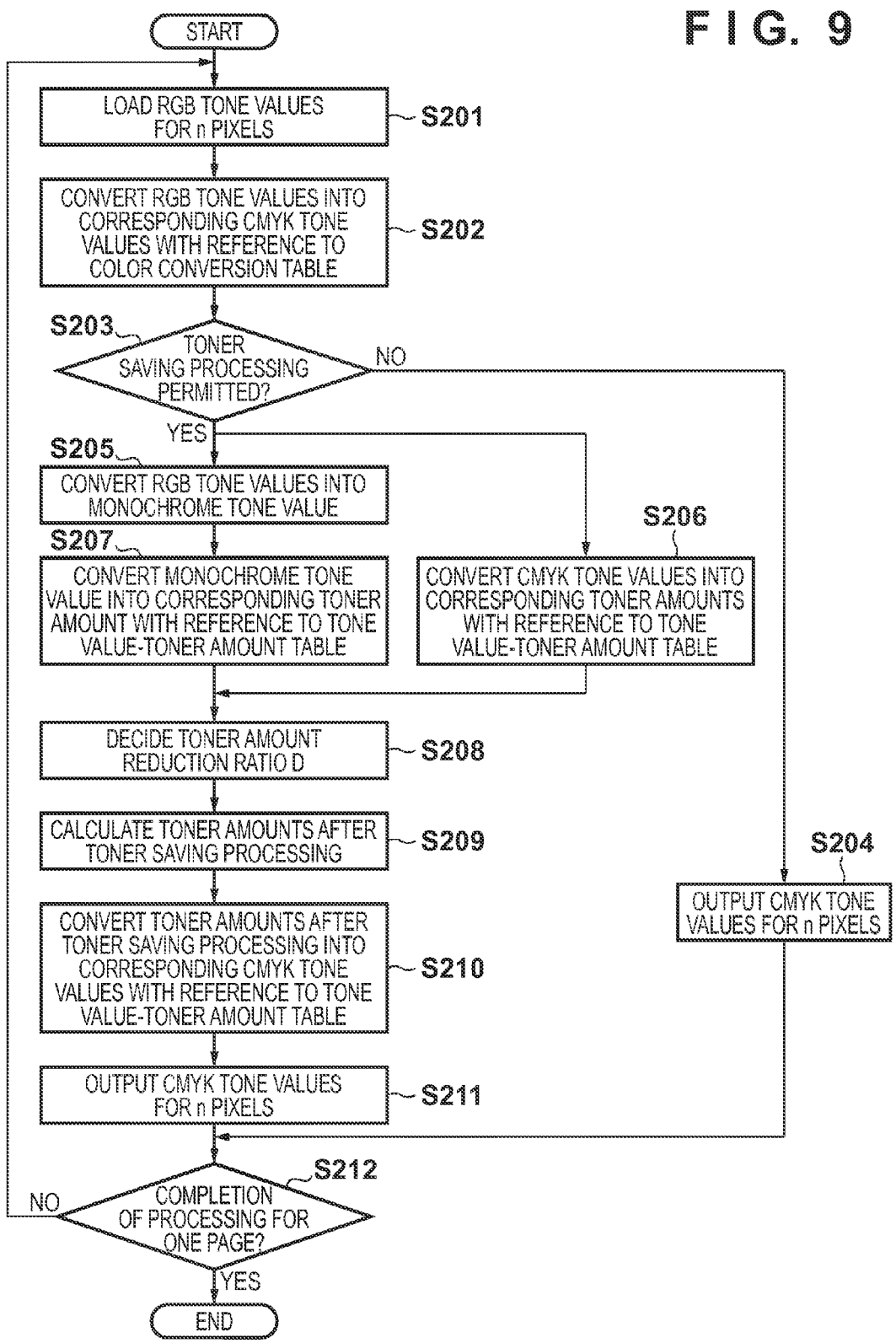
FIG. 9 is a flowchart showing the sequence of toner saving processing.

The sequence of the aforementioned toner saving processing executed by the toner saving processor 406 of an ASIC 308 will be described below with reference to FIG. 9. FIG. 9 is a flowchart showing the sequence of the toner saving processing according to this embodiment. When the toner saving processing is started, the toner saving processor 406 controls the first and second color converters 801 and 802 to sequentially load tone values R, G, and B for n pixels from drawing data in step S201. That is, in this embodiment, tone values of pixels are extracted for units of n pixels in turn from image data of an input color image. After that, the toner saving processor 406 advances the process to step S202.

In this case, reference numeral 510 in FIG. 5 denotes an example of a raster image of drawing data. The first and second color converters 801 and 802 load tone values for pixels of a predetermined number in the raster image, as shown in FIG. 5. For example, when n=4, tone values for four pixels included in a pixel group 511 are loaded first in the raster image 510 in FIG. 5. After processes in steps S202 to S212, tone values of pixels included in a pixel group 512 are loaded as those for next four pixels in the main scanning direction in step S201. Furthermore, upon completion of loading of tone values for one line in the main scanning direction (that is, tone values of a pixel group 513 located at a line end), tone values of pixels included in a start pixel group 514 in the next line in the sub-scanning direction are loaded in step S201. After that, in steps S202 to S211 except for step S208, respective processes can be executed for n pixels to have the tone values for n pixels loaded in step S201 as a processing unit.

In step S202, the toner saving processor 406 controls the second color converter 802 to convert tone values R, G, and B for n pixels into tone values C, M, Y, and K on the CMYK color space with reference to the color conversion table. The toner saving processor 406 determines in step S203 with reference to a setting about permission/inhibition of toner saving processing included in the control information whether or not the toner saving processing is permitted. If the toner saving processor 406 determines that the toner saving processing is not permitted, the process advances to step S204, and the toner saving processor 406 controls the tone converter 806 to output the tone values for n pixels, which have not undergone any toner saving processing, intact. After that, the toner saving processor 406 advances the process to step S212. On the other hand, if the toner saving processor 406 determines in step S203 that the toner saving processing is permitted, the process advances to steps S205 and S206.

In step S205, the toner saving processor 406 controls the first color converter 801 to convert the tone values R, G, and B for n pixels into tone values Km. In step S205, the tone values R, G, and B for n pixels of the input color image are respectively converted into monochrome tone values Km required to form the color image as a monochrome image.

In steps S206 and S207, toner amounts consumed to form respective pixels at densities corresponding to respective tone values are calculated. In step S206, the toner saving processor 406 controls the second toner amount calculator 804 to convert the tone values C, M, Y, and K for n pixels into corresponding toner amounts Ac, Am, Ay, and Ak with reference to the tone value—toner amount tables. In step S207, the toner saving processor 406 controls the first toner amount calculator 803 to convert the tone values Km for n pixels into corresponding toner amounts Akm with reference to the K tone value—toner amount table. In this case, the tone value Km corresponds to a tone value required to form a monochrome image using the K color. For this reason, the tone value—toner amount conversion table used in step S207 is a table 600d shown in FIG. 6, and the tone value Km is converted into a corresponding toner amount Akm, as denoted by reference numeral 609. With the processing in step S207, toner amounts Akm consumed to form a monochrome image are respectively calculated for pixels loaded in step S201 of a plurality of pixels included in the input color image. After steps S206 and S207, the process advances to step S208.

In step S208, the toner saving processor 406 controls the toner amount reduction ratio decision unit 805 to decide a toner amount reduction ratio D using:

$$D=(Ac+Am+Ay+Ak)/(Akm \times S) \tag{4}$$

Assume that the respective toner amounts Ac, Am, Ay, and Ak are sum totals of toner amounts of respective colors for n pixels. For example, when n=4, letting Ac1, Ac2, Ac3, and Ac4 be toner amounts for the C color of four pixels, Ac=Ac1+Ac2+Ac3+Ac4. The same as Ac applies to the toner amounts Am, Ay, and Ak. Also, the toner amount Akm is also a sum total of toner amounts for n pixels. In equation (4), (Ac+Am+Ay+Ak) represents a sum total of toner consumption amounts required to form an image for n pixels before the toner saving processing, and (Akm×S) represents a target toner amount (target value) for the sum total of the toner consumption amounts after the toner saving processing. Also, a coefficient S is a toner saving parameter included in the control information.

Next, in step S209, the toner saving processor 406 controls the tone converter 806 to calculate toner amounts Ac', Am', Ay', and Ak' for n pixels after the toner saving processing by substituting the decided toner amount reduction ratio D in:

$$Ac'=Ac/D, Am'=Am/D$$

$$Ay'=Ay/D, Ak'=Ak/D \tag{5}$$

Using equations (4) and (5), the sum total (Ac'+Am'+Ay'+Ak') of the toner consumption amounts for n pixels after the toner saving processing becomes equal to the target toner amount, as given by:

$$(Ac'+Am'+Ay'+Ak')=(Akm \times S) \tag{6}$$

As can be seen from equation (6), for example, when S=1, the toner consumption amount required to form an image using tone data for n pixels after the toner saving processing is equal to the toner consumption amount Akm for n pixels required to form the input color image as a monochrome image. When S=0.8, the toner consumption amount required to form an image using tone data for n pixels after the toner saving processing is adjusted to 80% of the toner consumption amount Akm for n pixels required to form the input color image as a monochrome image.

Next, in step S210, the toner saving processor 406 controls the tone converter 806 to convert the toner amounts Ac', Am', Ay', and Ak' for n pixels after the toner saving processing into corresponding tone values C', M', Y', and K' for n pixels with reference to the tone value—toner amount tables. The processing in step S210 is implemented by processing for calculating the corresponding tone values C', M', Y', and K' from the toner amounts Ac', Am', Ay', and Ak' of the respective colors, as denoted by reference numerals 605, 606, 607, and 608 in FIG. 6. After that, in step S211, the toner saving processor 406 controls the tone converter 806 to output the tone values C', M', Y', and K' for n pixels. The process then advances to step S212.

The toner saving processor 406 determines in step S212 whether or not the processes in steps S201 to S211 are complete for pixels for one page. In this case, if the toner saving processor 406 determines that the processes are not complete yet for pixels for one page, the process returns to step S201. On the other hand, if the toner saving processor 406 determines in step S212 that the processes are complete for all pixels for one page (that is, if the processes are complete for n pixels 515 at the page end in the raster image 510 shown in FIG. 5), the processing ends. Image forming processing based on the toner values after the toner saving processing, which is executed after this processing, is the same as that in the first embodiment.

Note that the case in which n=4 has been described above. When n=1, the toner saving processor 406 sequentially loads tone values of respective pixels, as shown in a raster image 500 shown in FIG. 5, so as to execute the processes in steps S202 to S211 using the loaded tone values. More specifically, the toner saving processor 406 loads tone values of a pixel 501 first in step S201, and executes the processes in step S202 and subsequent steps. Upon completion of the processes for the pixel 501, the toner saving processor 406 loads tone values of a next pixel 502 in the main scanning direction in step S201, and executes the processes in step S202 and subsequent steps. Upon completion of loading of tone values of a last pixel 503 in the main scanning direction of one line including the pixels 501 and 502, the toner saving processor 406 loads tone values of a first pixel 504 included in the next line in the sub-scanning direction in step S201, and executes the processes in step S202 and subsequent steps. Finally, when the toner saving processor 406 determines in step S212 that the processes are complete for all pixels for one page (that is, when it determines that the processes are complete for a pixel 505 at the page end in the raster image 500 shown in FIG. 5), the processing ends.

As described above, according to this embodiment, for tone values of an input color image, the toner saving processing is executed by extracting tone values for units of n pixels in place of one page unlike in the first embodiment. Thus, in addition to the effects of the first embodiment, since the toner saving processing is executed for each pixel, a time period required until image formation is started can be shortened compared to the toner saving processing executed for one page. As a result, a throughput of image formation can be improved. Also, unlike the toner saving processing executed for one page, tone values for one page need not be held in a storage device.

Note that a pixel selection method for loading n pixels from drawing data is not limited to that for selecting n pixels on a single line, as shown in the raster image 510 in FIG. 5. For example, as shown in a raster image 520 in FIG. 5, n pixels included in a plurality of lines may be selected. In case of the raster image 520 in FIG. 5, tone values of four pixels are loaded from a plurality of lines in an order of pixel groups 521 and 522 in the main scanning direction. After tone values of pixels included in a last pixel group 523 in the main scanning direction are loaded, a pixel group 524 is selected next. According to the loading method shown in the raster image 520 in FIG. 5, tone values for two lines can be simultaneously processed. This method is suited to a 2-beam exposure device which includes two laser-emitting elements for each color, and can simultaneously draw regions of two lines, when such exposure device is used as exposure devices 24C, 24M, 24Y, and 24K.

[Third Embodiment]

In the first and second embodiments, ratios among tone values of different colors are changed between tone values C, M, Y, and K before toner saving processing and tone values C', M', Y', and K' after the toner saving processing (that is, C:M:Y:K≠C':M':Y':K'). As a result, tints of a color image to be formed are changed before and after the toner saving processing. For example, assume that a toner amount reduction ratio D=2 when tone value—toner amount tables used in the toner saving processing have characteristics shown in FIG. 6. In this case, toner amounts Ac', Am', Ay', and Ak' after the toner saving processing are reduced to 50% with respect to original toner amounts Ac, Am, Ay, and Ak. On the other hand, tone values C', M', Y', and K' after the toner saving processing are respectively 63%, 65%, 56%, and 67% with respect to original tone values C, M, Y, and K, and the toner saving processing causes different changes of tone values for respective colors. This is because the relationship between tone values and toner amounts is nonlinear, and different characteristics are defined for respective colors. In the example of FIG. 6, since an image is formed using the tone values after the toner saving processing to be lighter in Y and darker in K, the tints of the image have changed by the toner saving processing. The third embodiment aims at eliminating tint changes of an image caused by the toner saving processing. More specifically, when toner amounts of a color image are adjusted with reference to a toner amount required to form the color image as a monochrome image, the tints of the color image before the adjustment are maintained after the adjustment.

<Arrangement of Toner Saving Processor 406>

Figure 10:
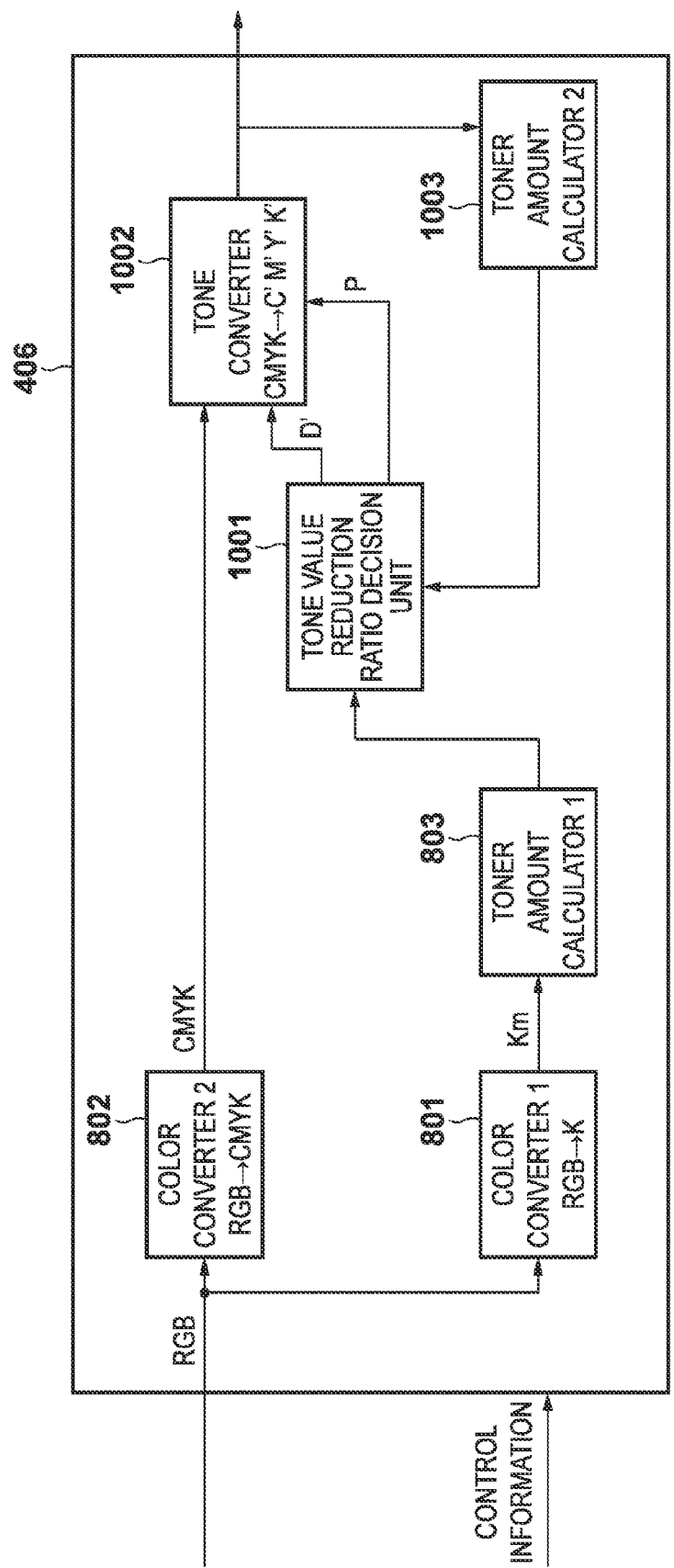
FIG. 10 is a block diagram associated with toner saving processing.

The toner saving processing to be executed by a toner saving processor 406 in this embodiment will be described below with reference to FIG. 10. Note that in FIG. 10, the same reference numerals as in FIG. 8 denote blocks which execute the same operations as in the second embodiment (FIG. 8), and a description thereof will not be repeated. A tone value reduction ratio decision unit 1001 receives a toner amount Akm calculated by a toner amount calculator 803, and toner amounts Ac', Am', Ay', and Ak' of respective colors required to form a color image. The tone value reduction ratio decision unit 1001 decides a tone value reduction ratio D' (second reduction ratio) required to reduce tone values of respective colors of the color image. The tone value reduction ratio decision unit 1001 decides the tone value reduction ratio D' using these pieces of input information, and a toner saving parameter S and tone value—toner amount tables extracted from control information input to the toner saving processor 406.

A tone converter 1002 converts (changes) tone values C, M, Y, and K input from a second color converter 802 into tone values C', M', Y', and K' after the toner saving processing according to the tone value reduction ratio D' decided by the tone value reduction ratio decision unit 1001, and outputs the tone values C', M', Y', and K'. A second toner amount calculator 1003 calculates toner amounts Ac', Am', Ay', and Ak' of respective colors consumed to form an image using the tone values C', M', Y', and K' using tone value—toner amount tables, which associate tone values with toner amounts, and outputs the toner amounts Ac', Am', Ay', and Ak'. These outputs are fed back to the tone value reduction ratio decision unit 1001, and are used to decide the tone value reduction ratio D'. Note that the tone value—toner amount tables used in the second toner amount calculator 1003 are extracted from the control information input to the toner saving processor 406.

<Sequence of Toner Saving Processing>

Figure 11:
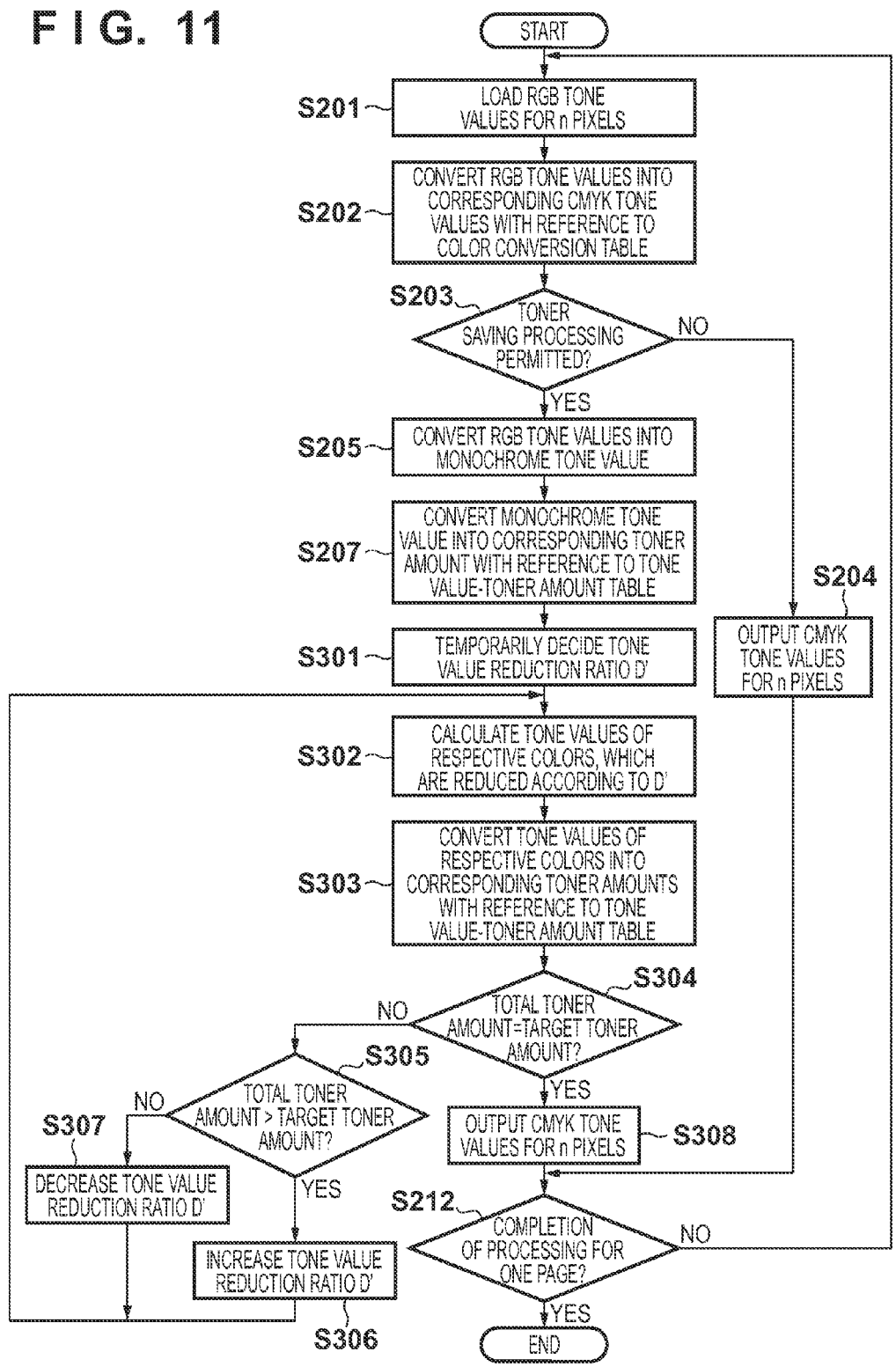
FIG. 11 is a flowchart showing the sequence of toner saving processing.
Figure 12:
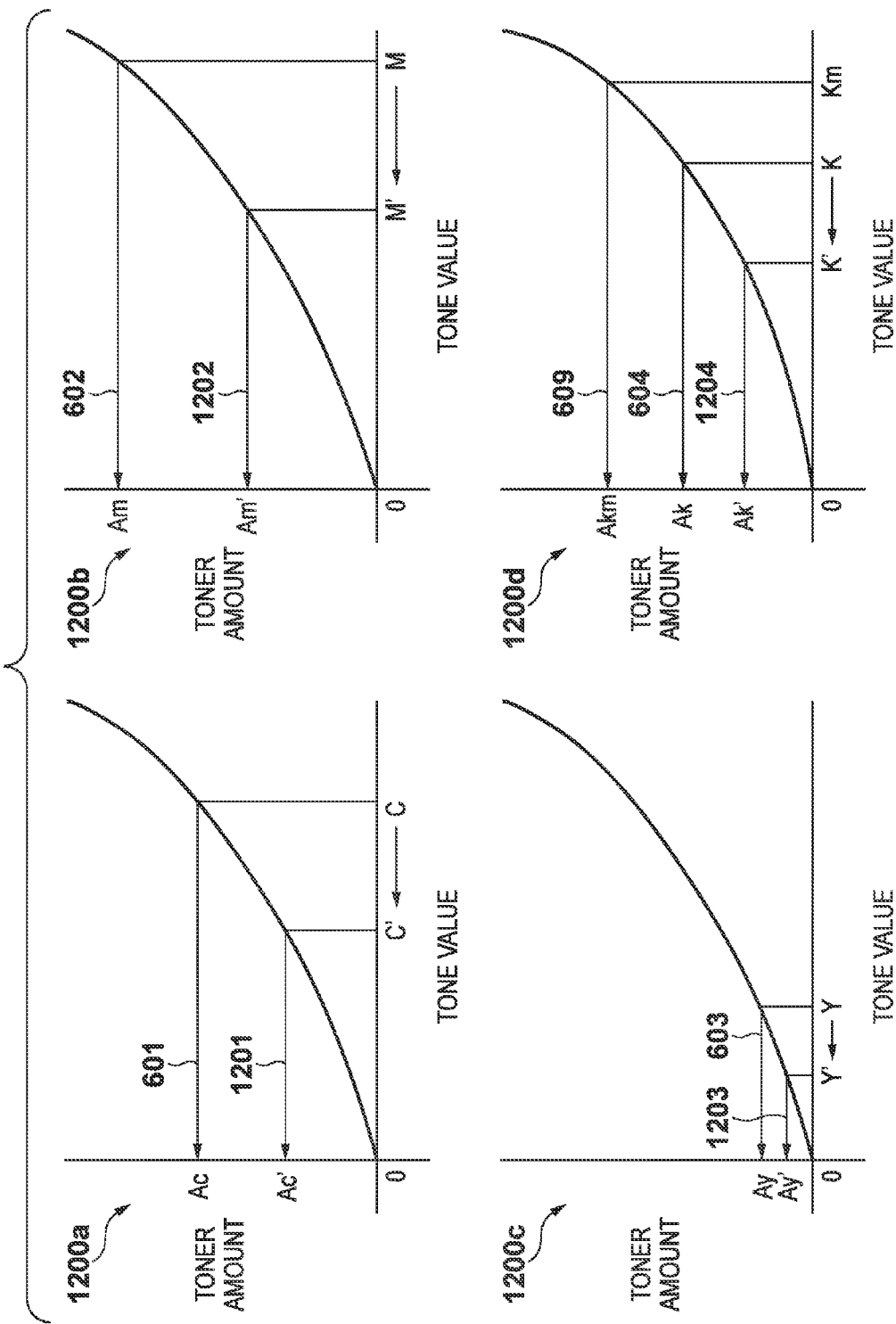
FIG. 12 shows examples of tone value—toner amount tables.

The sequence of the toner saving processing according to this embodiment executed by the toner saving processor 406 of an ASIC 308 will be described below with reference to FIGS. 11 and 12. FIG. 11 is a flowchart showing the sequence of the toner saving processing according to this embodiment. Note that in FIG. 11, the same reference numerals denote the same processes as in the second embodiment (FIG. 9), and a description thereof will not be repeated. In FIG. 11, processes different from FIG. 9 are steps S301 to S308.

As shown in FIG. 11, after the first toner calculator 803 calculates a toner amount Akm required to form a color image as a monochrome image in step S207, the toner saving processor 406 advances the process to step S301. In step S301, the toner saving processor 406 controls the tone value reduction ratio decision unit 1001 to temporarily decide a tone value reduction ratio D' to be an arbitrary value equal to or larger than 1, and the process advances to step S302. In step S302, the toner saving processor 406 controls the tone converter 1002 to calculate tone values C', M', Y', and K' for n pixels after the toner saving processing using:

$$C'=C/D', M'=M/D'$$

$$Y'=Y/D', K'=K/D' \tag{7}$$

Note that tone values of the n pixels can be substituted in turn in equations (7) to calculate tone values after the toner saving processing. As shown in equations (7), the toner saving processing according to this embodiment is executed by multiplying the tone values C, M, Y, and K before the toner saving processing by a coefficient (1/D') according to the tone value reduction ratio D'.

This process is different from the toner saving processing which adjusts toner amounts based on a toner amount reduction ratio D in the first and second embodiments. In the first and second embodiments, as described above, ratios of tone values are changed for respective colors between tone values C, M, Y, and K before the toner saving processing and tone values C', M', Y', and K' after the toner saving processing (that is, C:M:Y:K≠C':M':Y':K'). By contrast, in the toner saving processing of this embodiment using equation (7), since tone values for respective colors are adjusted by multiplying the tone values by the same coefficient (1/D'), the ratios among the tone values for a plurality of colors are maintained before and after the toner saving processing. That is, C:M:Y:K=C': M':Y':K' always holds. In this way, the tints of an input color image can be avoided from being changed by the toner saving processing.

After step S302, in step S303, the toner saving processor 406 controls the second toner amount calculator 1003 to convert the tone values C', M', Y', and K' for n pixels into corresponding toner amounts Ac', Am', Ay', and Ak' for respective pixels with reference to tone value—toner amount tables. FIG. 12 shows tone value—toner amount conversion tables as in FIG. 6. In the first and second embodiments, the toner amounts Ac', Am', Ay', and Ak' of respective colors are converted into corresponding tone values C', M', Y', and K', as denoted by reference numerals 605 to 608 in FIG. 6. By contrast, in this embodiment, the tone values C', M', Y', and K' of respective colors are converted into corresponding toner amounts Ac', Am', Ay', and Ak' for respective pixels, as denoted by reference numerals 1201 to 1204 in FIG. 12. These toner amounts Ac', Am', Ay', and Ak' correspond to temporary conversion results since they are calculated using the temporarily decided tone value reduction ratio D'.

In step S304, the toner saving processor 406 controls the tone value reduction ratio decision unit 1001 to determine whether or not a total toner amount (Ac'+Am'+Ay'+Ak') for n pixels after the toner saving processing matches a target toner amount (Akm×S). This determination is executed by seeing if the following equation holds.

$$(Ac'+Am'+Ay'+Ak')=(Akm\times S) \tag{8}$$

In this case, a coefficient S is a toner saving parameter extracted from the control information, and is used to adjust toner amounts after the toner saving processing. Also, toner amounts Ac', Am', Ay', Ak', and Akm are sum totals of toner amounts for n pixels, and represent toner amounts for n pixels. The target toner amount (Akm×S) is also a toner amount for n pixels. Note that in the determination process in step S304, when the toner amount after the toner saving processing and the target toner amount become closer values to some extent, it may be determined that equation (8) holds, in place of determining whether or not a difference between the left- and right-hand sides in equation (8) becomes strictly zero. For example, when a difference between these amounts is calculated, and it is determined that the difference falls within a certain range by, for example, threshold determination, it may be determined that equation (8) holds. For example, the value (Ac'+Am'+Ay'+Ak') in the left-hand side of equation (8) falls with a predetermined range with reference to the right-hand side (Akm×S) in equation (8), it may be determined that equation (8) holds.

For example, when equation (8) holds for S=1, the toner consumption amount required to form an image using tone data after the toner saving processing can be equal to that required to form an input color image as a monochrome image. On the other hand, when equation (8) holds for S=0.8, the toner consumption amount required to form an image using tone data after the toner saving processing can be adjusted to 80% of that required to form an input color image as a monochrome image.

If it is determined in step S304 that equation (8) holds, the process advances to step S308. On the other hand, if it is determined that equation (8) does not hold, the process advances to step S305. In step S305, the toner saving processor 406 controls the tone value reduction ratio decision unit 1001 to determine if (total toner amount after toner saving processing>target toner amount) is satisfied. That is, the tone value reduction ratio decision unit 1001 determines whether or not $$(Ac'+Am'+Ay'+Ak')>(Akm\times S) \tag{9}$$

holds. According to the determination result, the toner saving processor 406 executes the following processes in steps S306 and S307, so that the total toner amount for n pixels after the toner saving processing becomes closer to the target toner amount.

In this case, if inequality (9) holds in step S305, the toner saving processor 406 controls the tone value reduction ratio decision unit 1001 to increase the tone value reduction ratio D' in step S306. On the other hand, if inequality (9) does not hold in step S305, the toner saving processor 406 controls the tone value reduction ratio decision unit 1001 to decrease the tone value reduction ratio D' in step S307. With these processes, the (total) toner amount after the toner saving processing is increased or decreased, and the toner amount for n pixels after the toner saving processing becomes closer to the target toner amount. After steps S306 and S307, the process returns to step S302. After that, the toner saving processor 406 repeats the processes in steps S302 to S307 until equation (8) holds in step S304.

If it is determined in step S304 that equation (8) holds, the tone value reduction ratio decision unit 1001 sends an output instruction signal P which instructs to output tone values for n pixels to the tone converter 1002. Then, in step S308, the toner saving processor 406 controls the tone converter 1002 to output the tone values C', M', Y', and K' for n pixels as those after the toner saving processing.

As described above, according to this embodiment, toner amounts at the time of image formation are adjusted, so that the toner amount (Ac'+Am'+Ay'+Ak') for n pixels after the toner saving processing matches the target toner amount (Akm×S). Furthermore, since ratios among tone values of different colors are maintained before and after the toner saving processing, an image to be formed does not suffer any tint changes due to the toner saving processing.

As described above, according to the third embodiment, tone values of a color image are reduced using the tone value reduction ratio, which is decided with reference to a toner amount required to form the color image as a monochrome image, thereby reducing the toner amounts required to form the color image. In this way, in addition to the effects of the second embodiment, tint changes of an image caused by the toner saving processing can be eliminated.

[Fourth Embodiment]

In the first and second embodiments, a toner amount reduction ratio D is decided using toner amounts Ac, Am, Ay, and Ak, and a toner amount Akm consumed to form a color image as a monochrome image. Furthermore, toner amounts of respective colors consumed to form the color image are adjusted according to the decided toner amount reduction ratio D. In this manner, in the first embodiment, the toner amounts are adjusted with reference to the toner amount consumed to form the color image as a monochrome image. On the other hand, as a criterion upon adjusting the toner amounts, another criterion (for example, costs of color materials) may be used in addition to the toner amount consumed to form the color image as a monochrome image.

As a technique for adjusting a toner consumption amount based on a cost of a color material (toner cost), the following techniques have been proposed so far. For example, Japanese Patent Laid-Open No. 2009-18460 discloses a technique for adjusting amounts of color materials used to form a color image based on a cost of a color material required to form the color image as a monochrome image when the input color image is formed on a recording medium using color materials (inks). More specifically, by multiplying tone values included in drawing data for one page required to form an image for one page by an adjustment coefficient, amounts of color materials are adjusted. Furthermore, whether or not costs of color materials in image formation using the drawing data after adjustment of the amounts of color materials fall within a predetermined range is determined, and whether or not to proceed with image formation is determined according to the determination result.

The fourth embodiment is characterized in that toner amounts of respective colors consumed to form an input color image are adjusted with reference to a toner cost required to form the color image as a monochrome image, as a modification of the first to third embodiments. Note that differences from the first to third embodiments will be mainly described below for the sake of simplicity. This embodiment will explain a case in which toner saving processing is executed for each pixel (n=1).

<Arrangement of Toner Saving Processor 406>

Figure 14:
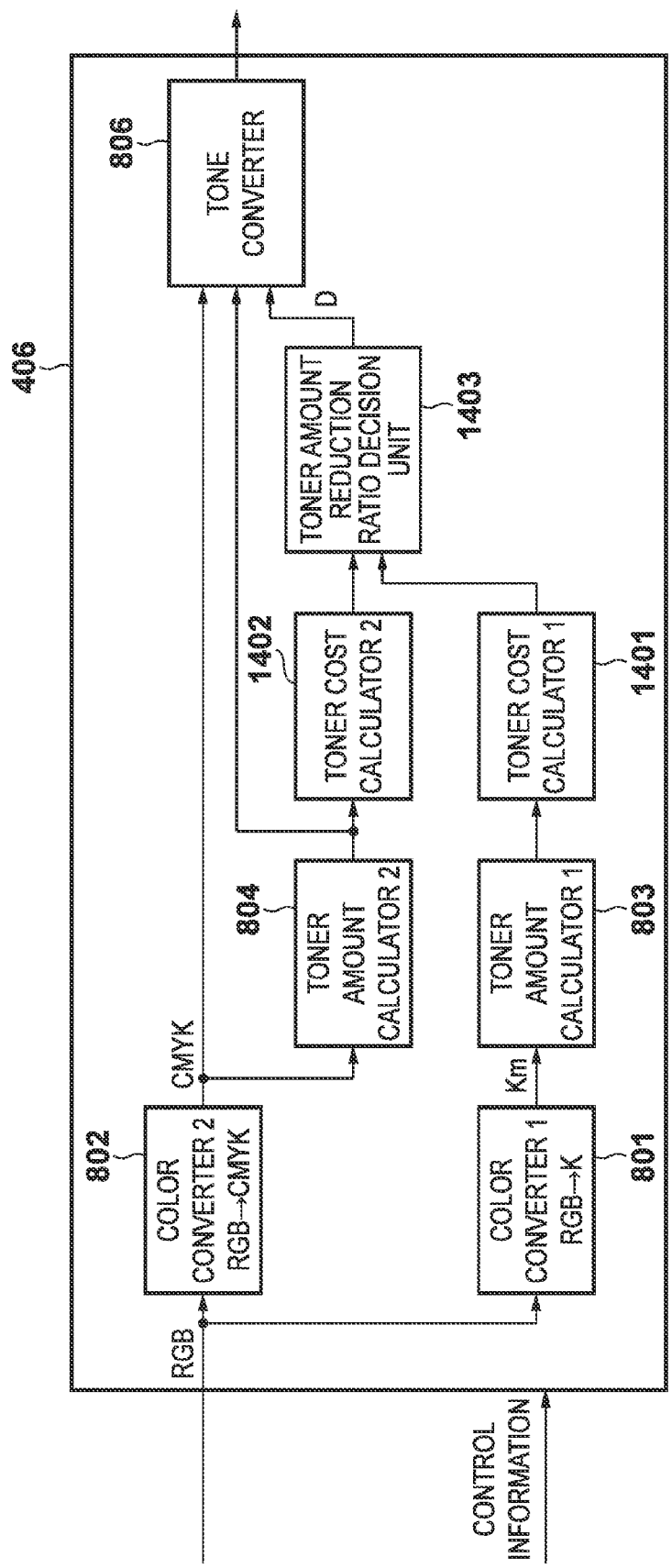
FIG. 14 is a block diagram associated with toner saving processing.

The block arrangement of a toner saving processor 406 and toner saving processing to be executed by the toner saving processor 406 will be described below with reference to FIG. 14. Note that in FIG. 14, the same reference numerals as in FIG. 8 denote blocks which execute the same operations as in FIG. 8, and a description thereof will not be repeated. The toner saving processor 406 shown in FIG. 14 is different from that shown in FIG. 8 in that a first toner cost calculator 1401 and second toner cost calculator 1402 are added, and a different parameter is used in a calculation of a toner amount reduction ratio D in a toner amount reduction ratio decision unit 1403. In this embodiment, a calculation result of a toner amount Akm consumed to form an image using a monochrome tone value Km by a first toner amount calculator 803 is output to the first toner cost calculator 1401. On the other hand, calculation results of toner amounts Ac, Am, Ay, and Ak consumed to form an image using tone values C, M, Y, and K by a second toner amount calculator 804 are output to the second toner cost calculator 1402 and a tone converter 806.

Control information, which is generated by a CPU 303 and is input to the toner saving processor 406, includes a cost coefficient table which specifies the relationship between toner amounts and toner costs for respective colors to be used. The first and second toner cost calculators 1401 and 1402 extract the cost coefficient table from the control information, and use it in their cost calculations. The first toner cost calculator 1401 calculates, as a cost of a toner amount Akm, a toner cost Pkm corresponding to that toner amount using the cost coefficient table. The second toner cost calculator 1402 calculates, as costs of toner amounts Ac, Am, Ay, and Ak of respective colors, toner costs Pc, Pm, Py, and Pk corresponding to these toner amounts. The first and second toner cost calculators 1401 and 1402 output the calculation results to the toner amount reduction ratio decision unit 1403.

The toner amount reduction ratio decision unit 1403 decides a toner amount reduction ratio D by a calculation to be described later using the input toner costs Pkm, Pc, Pm, Py, and Pk, and a toner saving parameter S, and outputs the decided ratio D to the tone converter 806. The toner saving parameter S is extracted from the control information input to the toner saving processor 406 as in the first embodiment. Finally, the tone converter 806 outputs tone values C', M', Y', and K' after the toner saving processing using the toner amount reduction ratio D, the toner amounts Akm, Ac, Am, Ay, and Ak, and tone value—toner amount tables extracted from the control information.

<Sequence of Toner Saving Processing>

Figure 15:
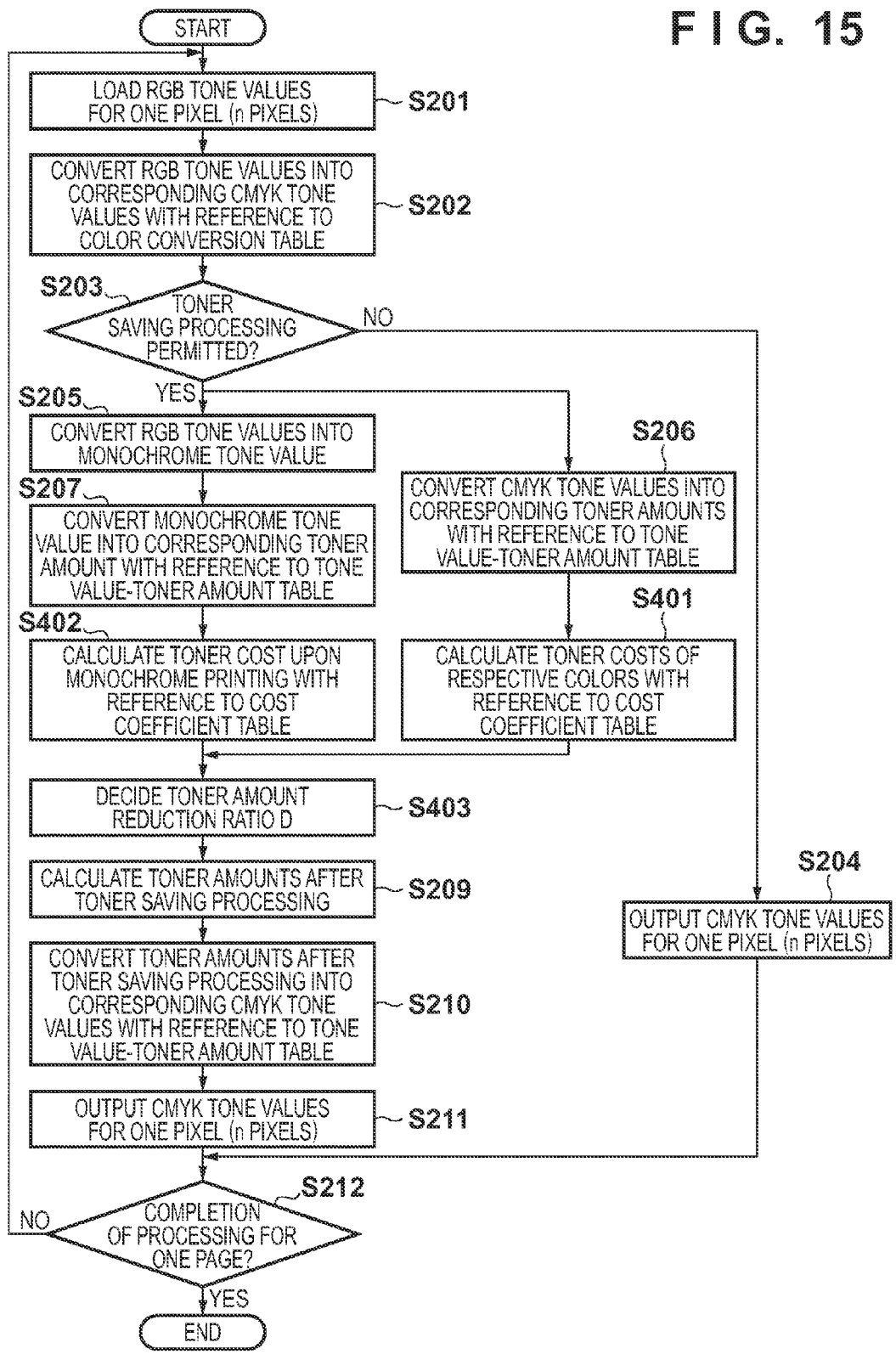
FIG. 15 is a flowchart showing the sequence of toner saving processing.

The sequence of the aforementioned toner saving processing executed by the toner saving processor 406 of an ASIC 308 will be described below with reference to FIGS. 15 and 16. FIG. 15 is a flowchart showing the sequence of the toner saving processing according to this embodiment. Note that in FIG. 15, the same reference numerals denote the same processes as in the second embodiment (FIG. 9), and a description thereof will not be repeated.

Steps S201 to S207 are the same as those in the second embodiment. After toner amounts Ac, Am, Ay, Ak, and Akm are calculated in steps S206 and S207, the process advances to steps S401 and S402. In step S401, the toner saving processor 406 controls the second toner cost calculator 1402 to calculate toner costs corresponding to the toner amounts Ac, Am, Ay, and Ak. FIG. 16 shows an example of a cost coefficient table used in the calculation. Cost coefficients Qc, Qm, Qy, and Qk held in a cost coefficient table 1600 shown in FIG. 16 respectively represent toner costs per unit toner amount in association with C, M, Y, and K colors. The second toner cost calculator 1402 calculates toner costs Pc, Pm, Py, and Pk by multiplying the toner amounts Ac, Am, Ay, and Ak by corresponding cost coefficients with reference to the cost coefficient table, as given by:

$$Pc = Ac \times Qc, \; Pm = Am \times Qm$$

$$Py = Ay \times Qy, \; Pk = Ak \times Qk \quad (10)$$

On the other hand, in step S402, the toner saving processor 406 controls the first toner cost calculator 1401 to calculate a toner cost corresponding to the toner amount Akm. A cost coefficient used in this calculation can use the cost coefficient Qk for the K color. The toner cost is calculated by:

$$Pkm = Akm \times Qk \quad (11)$$

After the toner costs Pc, Pm, Py, Pk, and Pkm corresponding to the respective toner amounts are calculated in steps S401 and S402, the process advances to step S403.

In step S403, the toner saving processor 406 controls the toner amount reduction ratio decision unit 1403 to decide a toner amount reduction ratio D using:

$$D = (Pc + Pm + Py + Pk)/(Pkm \times S) \quad (12)$$

In this manner, equation (12) corresponds to that in which toner amounts Ac, Am, Ay, Ak, and Akm included in equation (4) in the second embodiment are replaced by the toner costs Pc, Pm, Py, Pk, and Pkm. In equation (12), (Pc+Pm+Py+Pk)

represents a total toner cost for the toner consumption amounts of all colors before the toner saving processing, and (Pkm×S) represents a target toner cost after the toner saving processing. Also, a coefficient S is a toner saving parameter included in the control information. In this embodiment, the toner saving parameter is that used as an adjustment ratio required to adjust a toner cost after the toner saving processing. The toner saving parameter S is an adjustment ratio, which is set in advance, and is used to specify a ratio of a toner consumption amount to a toner cost required to form a color image as a monochrome image.

After the toner amount reduction ratio D is decided in step S403, the process advances to step S209. In step S209 and subsequent steps, the same processes as in the second embodiment are executed. That is, in step S209, toner amounts Ac', Am', Ay', and Ak' after the toner saving processing are calculated. In step S210, tone values corresponding to the toner amounts are calculated so as to form an image using the toner amounts after the toner saving processing. In this manner, with the processes using equations (10) to (12) and equations (5), toner amounts of an input color image can be adjusted with reference to a toner cost required to form the color image as a monochrome image.

As described above, according to the fourth embodiment, toner amounts consumed to form an input color image are adjusted for each pixel with reference to a toner cost corresponding to a toner amount required to form the color image as a monochrome image. Even when such toner saving processing is executed, a time period required until image formation is started can be shortened compared to toner saving processing for one page as in the second embodiment. Also, unlike in the toner saving processing executed for one page, tone values for one page need not be held in a storage device.

[Fifth Embodiment]

In the fourth embodiment, a toner amount reduction ratio D is decided for each pixel, and toner amounts are adjusted for each pixel based on the decided ratio D. However, the processing described in the fourth embodiment is not limited to toner saving processing for each pixel, but is also applicable to a case in which toner amounts are adjusted to have n pixels (n is an integer equal to or larger than 1) as a unit of the toner saving processing as in the second and third embodiments. Hence, the fifth embodiment will explain a case in which the toner saving processing described in the fourth embodiment is executed for n pixels in place of one pixel.

In this embodiment, the arrangement of a toner saving processor 406 is the same as that shown in FIG. 14 in the fourth embodiment. Respective blocks shown in FIG. 14 execute processes for n pixels in place of those for one pixel. The sequence for a case in which toner amount adjustment based on toner costs described in the fourth embodiment is processed for n pixels in place of one pixel will be described below with reference to FIG. 15.

When the toner saving processing is started, the toner saving processor 406 controls first and second color converters 801 and 802 to sequentially load tone values R, G, and B for n pixels from drawing data in step S201. That is, in this embodiment, tone values of pixels are extracted on the n-pixel basis in turn from image data of an input color image. In this case, reference numeral 510 in FIG. 5 denotes an example of a raster image of drawing data. The first and second color converters 801 and 802 load tone values for pixels of a predetermined number in the raster image, as shown in FIG. 5. For example, when n=4, tone values for four pixels included in a pixel group 511 are loaded first in the raster image 510 in FIG. 5. After processes in steps S202 to S212, tone values of pixels included in a pixel group 512 are loaded as those for next four pixels in the main scanning direction in step S201. Furthermore, upon completion of loading of tone values for one line in the main scanning direction (that is, tone values of a pixel group 513 located at a line end), tone values of pixels included in a start pixel group 514 in the next line in the sub-scanning direction are loaded in step S201.

After that, in steps S202 to S211 and steps S401 to S403, the same processes as in the fourth embodiment can be executed for n pixels to have the tone values for n pixels loaded in step S201 as a processing unit. That is, toner amounts Ac, Am, Ay, Ak, and Akm, and toner costs Pc, Pm, Py, Pk, and Pkm need only be individually calculated for respective pixels. Note that one value of a toner amount reduction ratio D in step S403 is calculated for n pixels using the toner costs Pc, Pm, Py, and Pk for n pixels. That is, in $$D=(Pc+Pm+Py+Pk)/(Pkm\times S) \qquad (12)$$

the toner costs Pc, Pm, Py, and Pk can be sum totals for respective colors of the toner costs calculated for respective pixels. For example, when n=4, letting Pc1, Pc2, Pc3, and Pc4 be toner costs for C in four pixels, Pc=Pc1+Pc2+Pc3+Pc4. The same as Pc applies to Pm, Py, and Pk. Also, the toner cost Pkm can be a sum total of toner costs calculated for n pixels.

In this embodiment, (Pc+Pm+Py+Pk) represents a total of toner costs of all colors before the toner saving processing when an image is formed for n pixels as a target of the toner saving processing. Pkm represents a toner cost when n pixels as a target of the toner saving processing are formed as monochrome pixels. In this way, (Pc+Pm+Py+Pk) and Pkm correspond to toner costs for n pixels. In equation (12), (Pkm×S) corresponds to a target toner cost for n pixels in the toner saving processing.

For example, when S=1, a toner cost required to form an image using tone data for n pixels after the toner saving processing is equal to that for n pixels required to form an input color image as a monochrome image. When S=0.8, a toner cost required to form an image using tone data for n pixels after the toner saving processing is adjusted to 80% of that for n pixels required to form an input color image as a monochrome image. In this manner, even when processing is executed for n pixels, toner amounts required to form a color image can be adjusted based on a toner cost required to form the color image as a monochrome image by adjusting a toner saving parameter S.

After that, in step S209, the same processing as in the second embodiment is executed for n pixels using a toner amount reduction ratio D calculated in step S403, thus calculating toner amounts for n pixels after the toner saving processing. In step S210 as well, the same processing as in the second embodiment is executed for n pixels. Finally, in step S204 or S211, tone values for n pixels, which have not undergone any toner saving processing, or tone values for n pixels, which have undergone the toner saving processing, are output from a tone converter 806. The aforementioned processing for n pixels is executed for all pixels of one page based on the determination result in step S212.

As described above, according to the fifth embodiment, the toner saving processing is executed for n pixels together (n-pixel basis) in place of one pixel. In this manner, the number of times of processing required to execute the toner saving processing for drawing data for one page can be reduced to 1/n, thus improving a throughput of image formation.

[Sixth Embodiment]

The sixth embodiment aims at eliminating tint changes of an image caused by toner saving processing as in the third embodiment. More specifically, when toner amounts of a color image are adjusted with reference to a toner cost required to form the color image as a monochrome image, tints of the color image before the adjustment are maintained after the adjustment.

<Arrangement of Toner Saving Processor 406>

Figure 17:
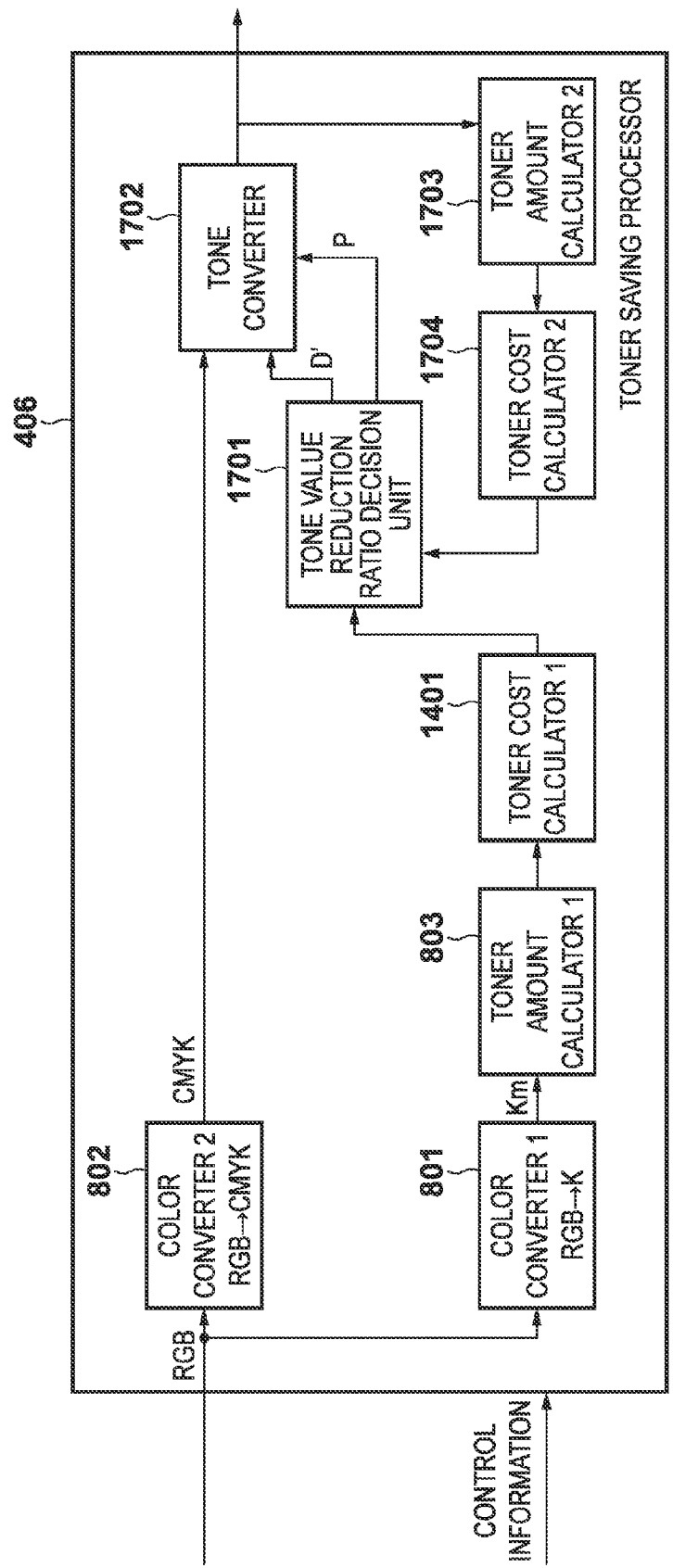
FIG. 17 is a block diagram associated with toner saving processing.

Toner saving processing to be executed by a toner saving processor 406 in this embodiment will be described below with reference to FIG. 17. Note that in FIG. 17, the same reference numerals as in FIG. 14 denote blocks which execute the same operations as in the fourth embodiment (FIG. 14), and a description thereof will not be repeated. A tone value reduction ratio decision unit 1701 receives a toner cost Pkm corresponding to a toner amount Akm, which is calculated by a toner cost calculator 1401, and toner costs Pc', Pm', Py', and Pk' corresponding to toner amounts of respective colors used to form a color image. The tone value reduction ratio decision unit 1701 decides a tone value reduction ratio D' (second reduction ratio) required to reduce tone values of respective colors of a color image. The tone value reduction ratio decision unit 1701 decides the tone value reduction ratio D' using these pieces of input information, and a toner saving parameter S and tone value—toner amount tables extracted from control information input to the toner saving processor 406.

A tone converter 1702 converts (changes) tone values C, M, Y, and K input from a second color converter 802 into tone values C', M', Y', and K' after the toner saving processing in accordance with the tone value reduction ratio D' decided by the tone value reduction ratio decision unit 1701, and outputs the tone values C', M', Y', and K'. A second toner amount calculator 1703 calculates toner amounts Ac', Am', Ay', and Ak' of respective colors consumed to form an image using the tone values C', M', Y', and K' with reference to tone value—toner amount tables which associate tone values with toner amounts. A second toner cost calculator 1704 calculates toner costs Pc', Pm', Py', and Pk' when the toner amounts Ac', Am', Ay', and Ak' are consumed for respective colors, using a cost coefficient table including cost coefficients, which indicate toner costs per unit toner amount. The calculated toner costs Pc', Pm', Py', and Pk' are fed back to the tone value reduction ratio decision unit 1701 and are used to decide the tone value reduction ratio D'. Note that the tone value—toner amount tables used in the second toner amount calculator 1703 and the cost coefficient table used in the toner cost calculator 1704 are extracted from the control information input to the toner saving processor 406.

<Sequence of Toner Saving Processing>

The sequence of the toner saving processing according to this embodiment executed by the toner saving processor 406 of an ASIC 308 will be described below with reference to FIGS. 18 and 12. FIGS. 18A and 18B are flowcharts showing the sequence of the toner saving processing according to this embodiment. Note that in FIGS. 18A and 18B, the same reference numerals denote the same processes as in the fourth embodiment (FIG. 15), and a description thereof will not be repeated. In FIGS. 18A and 18B, processes different from FIG. 15 are steps S601 to S609.

Figure 18A:
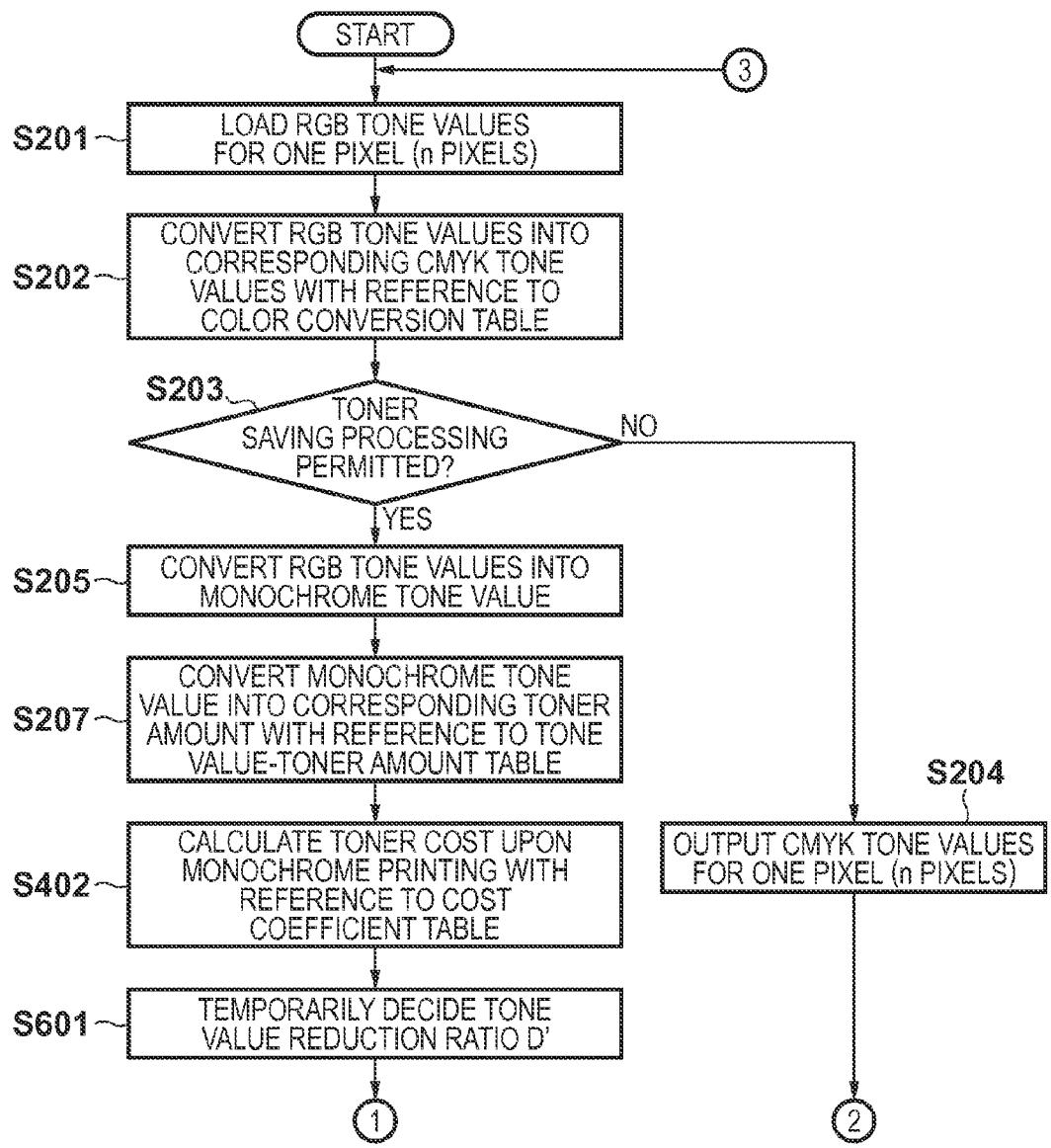
FIGS. 18A and 18B are flowcharts showing the sequence of toner saving processing.
Figure 18B:
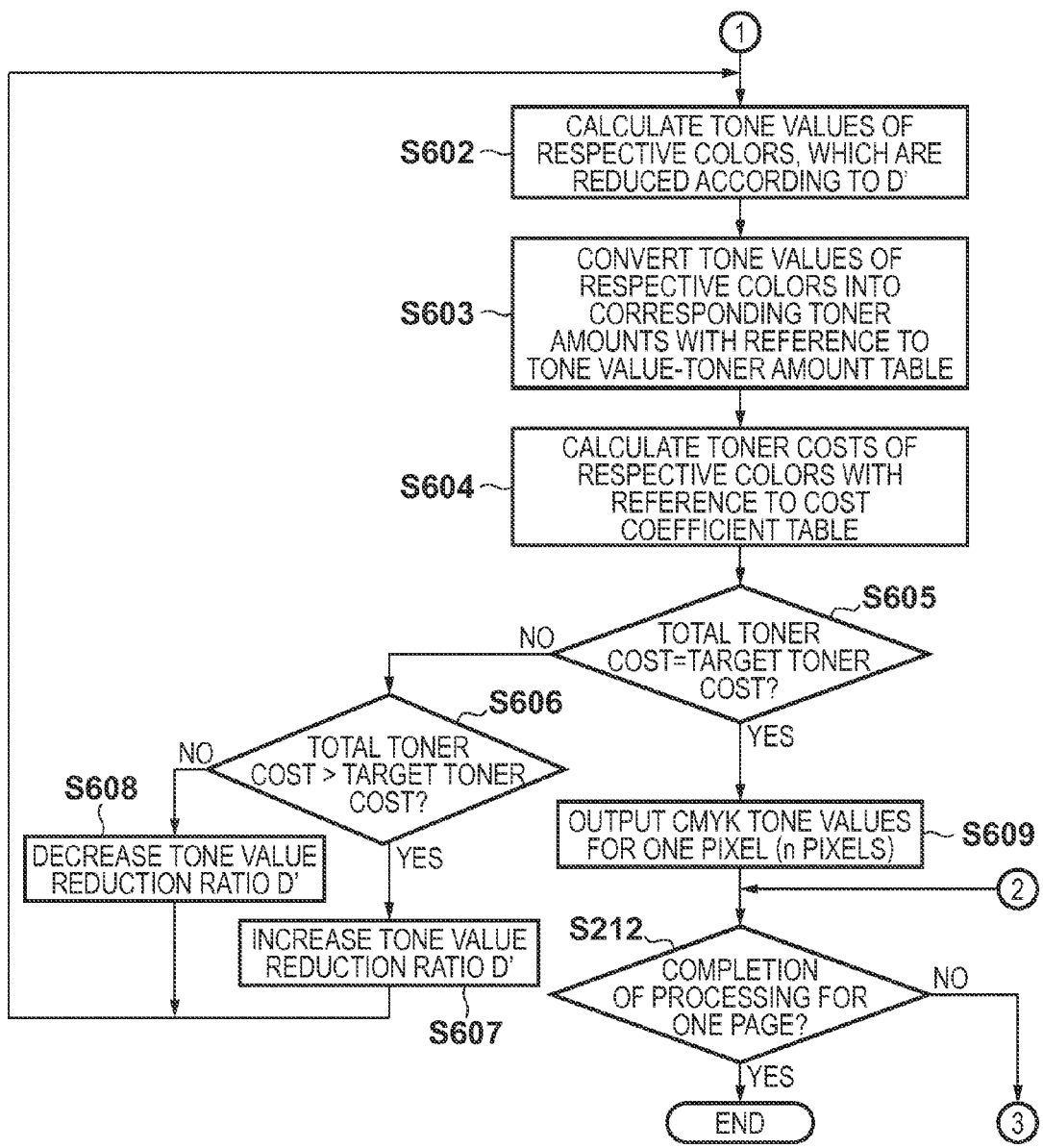

As shown in FIGS. 18A and 18B, after the toner saving processor 406 controls the toner cost calculator 1401 to calculate a toner cost Pkm corresponding to a toner amount Akm required to form a color image as a monochrome image in step S402, the process advances to step S601. In step S601, the toner saving processor 406 controls the tone value reduction ratio decision unit 1701 to temporarily decide a tone value reduction ratio D' to be an arbitrary value equal to or larger than 1, and the process advances to step S602. In step S602, the toner saving processor 406 controls the tone converter 1702 to calculate tone values C', M', Y', and K' after the toner saving processing using:

$$C'=C/D', M'=M/D'$$

$$Y'=Y/D', K'=K/D' \quad (13)$$

The tone values C', M', Y', and K' are changed to be smaller than tone values C, M, Y, and K since the tone value reduction ratio D' is an arbitrary value equal to or larger than 1. As shown in equations (13), the toner saving processing according to this embodiment is executed by multiplying the tone values C, M, Y, and K before the toner saving processing by a coefficient (1/D') according to the tone value reduction ratio D'.

This process is different from toner saving processing which adjusts toner amounts based on a toner amount reduction ratio D in the fourth and fifth embodiments. In the fourth and fifth embodiments, as described above, ratios of tone values are changed for respective colors between tone values C, M, Y, and K before the toner saving processing and tone values C', M', Y', and K' after the toner saving processing (that is, C:M:Y:K≠C':M':Y':K'). By contrast, in the toner saving processing of this embodiment using equations (13), since tone values for respective colors are adjusted by multiplying the tone values by the same coefficient (1/D'), as in the third embodiment, the ratios among the tone values for a plurality of colors are maintained before and after the toner saving processing. That is, C:M:Y:K=C':M':Y':K' always holds. In this way, the tints of an input color image can be avoided from being changed by the toner saving processing.

After step S602, in step S603, the toner saving processor 406 controls the second toner amount calculator 1703 to convert the tone values C', M', Y', and K' into corresponding toner amounts Ac', Am', Ay', and Ak' with reference to tone value—toner amount tables. In this embodiment, the tone values C', M', Y', and K' of respective colors are converted into corresponding toner amounts Ac', Am', Ay', and Ak', as denoted by reference numerals 1201 to 1204 in FIG. 12.

In step S604, the toner saving processor 406 controls the second toner cost calculator 1704 to calculate corresponding toner costs Pc', Pm', Py', and Pk' from the toner amounts Ac', Am', Ay', and Ak' with reference to a cost coefficient table 1600 (FIG. 16) using:

$$Pc'=Ac'\times Qc, Pm'=Am'\times Qm$$

$$Py'=Ay'\times Qy, Pk'=Ak'\times Qk \quad (14)$$

These toner costs Pc', Pm', Py', and Pk' correspond to temporary conversion results since they are values calculated based on the temporarily decided tone value reduction ratio D'.

Based on the calculation results in step S604, the toner saving processor 406 controls the tone value reduction ratio decision unit 1701 to determine in step S605 whether or not a total toner cost (Pc'+Pm'+Py'+Pk') after the toner saving processing matches a target toner cost. This determination is implemented by seeing whether or not the following equation holds.

$$(Pc'+Pm'+Py'+Pk')=(Pkm\times S) \quad (15)$$

In this case, a coefficient S is a toner saving parameter extracted from the control information, and is used to adjust the toner amounts after the toner saving processing. Also, (Pkm×S) is a target toner cost. Note that in the determination process in step S605, when the toner cost after the toner saving processing and the target toner cost become closer values to some extent, it may be determined that equation (15) holds, in place of determining whether or not a difference between the left- and right-hand sides in equation (15)

becomes strictly zero. For example, when a difference between these costs is calculated, and it is determined that the difference falls within a certain range by, for example, threshold determination, it may be determined that equation (15) holds. For example, the value of the left-hand side (Pc'+Pm'+Py'+Pk') of equation (15) falls with a predetermined range with reference to the right-hand side (Pkm×S) in equation (15), it may be determined that equation (15) holds.

For example, when equation (15) holds for S=1, the toner cost required to form an image using tone data after the toner saving processing can be equal to the toner cost Pkm required to form an input color image as a monochrome image. On the other hand, when equation (15) holds for S=0.8, the toner cost required to form an image using tone data after the toner saving processing can be adjusted to 80% of the toner cost Pkm required to form an input color image as a monochrome image.

If it is determined in step S605 that equation (15) holds, the process advances to step S609. On the other hand, if it is determined that equation (15) does not hold, the process advances to step S606. In step S606, the toner saving processor 406 controls the tone value reduction ratio decision unit 1701 to determine if (total toner cost after toner saving processing>target toner cost) is satisfied. That is, the tone value reduction ratio decision unit 1701 determines whether or not $$(Pc'+Pm'+Py'+Pk')>(Pkm\times S) \quad (16)$$

holds. According to the determination result, the toner saving processor 406 executes the following processes in steps S607 and S608, so that the (total) toner cost after the toner saving processing becomes closer to the target toner cost.

In this case, if inequality (16) holds in step S606, the toner saving processor 406 controls the tone value reduction ratio decision unit 1701 to increase the tone value reduction ratio D' in step S607. On the other hand, if inequality (16) does not hold in step S606, the toner saving processor 406 controls the tone value reduction ratio decision unit 1701 to decrease the tone value reduction ratio D' in step S608. With these processes, the (total) toner cost after the toner saving processing is increased or decreased, and the toner cost after the toner saving processing becomes closer to the target toner cost. After steps S607 and S608, the process returns to step S602. After that, the toner saving processor 406 repeats the processes in steps S602 to S608 until equation (15) holds in step S605.

If it is determined in step S605 that equation (15) holds, the tone value reduction ratio decision unit 1701 sends an output instruction signal P which instructs to output tone values for one pixel to the tone converter 1702. Then, in step S609, the toner saving processor 406 controls the tone converter 1702 to output the tone values C', M', Y', and K' for one pixel as those after the toner saving processing.

As described above, according to this embodiment, toner amounts at the time of image formation are adjusted, so that the toner cost (Pc'+Pm'+Py'+Pk') after the toner saving processing matches the target toner cost (Pkm×S). Furthermore, since ratios among tone values of different colors are maintained before and after the toner saving processing, an image to be formed does not suffer any tint changes due to the toner saving processing.

As described above, according to the sixth embodiment, tone values of a color image are reduced using the tone value reduction ratio, which is decided with reference to a toner cost required to form the color image as a monochrome image, thereby reducing the toner amounts required to form the color image. In this way, in addition to the effects of the second embodiment, tint changes of an image caused by the toner saving processing can be eliminated.

[Seventh Embodiment]

It is useful for the user to arbitrarily set a setting about permission/inhibition of toner saving processing and toner saving parameter S described in the first to sixth embodiments. This embodiment will explain an image processing apparatus which allows the user to arbitrary set these settings.

Figure 13:
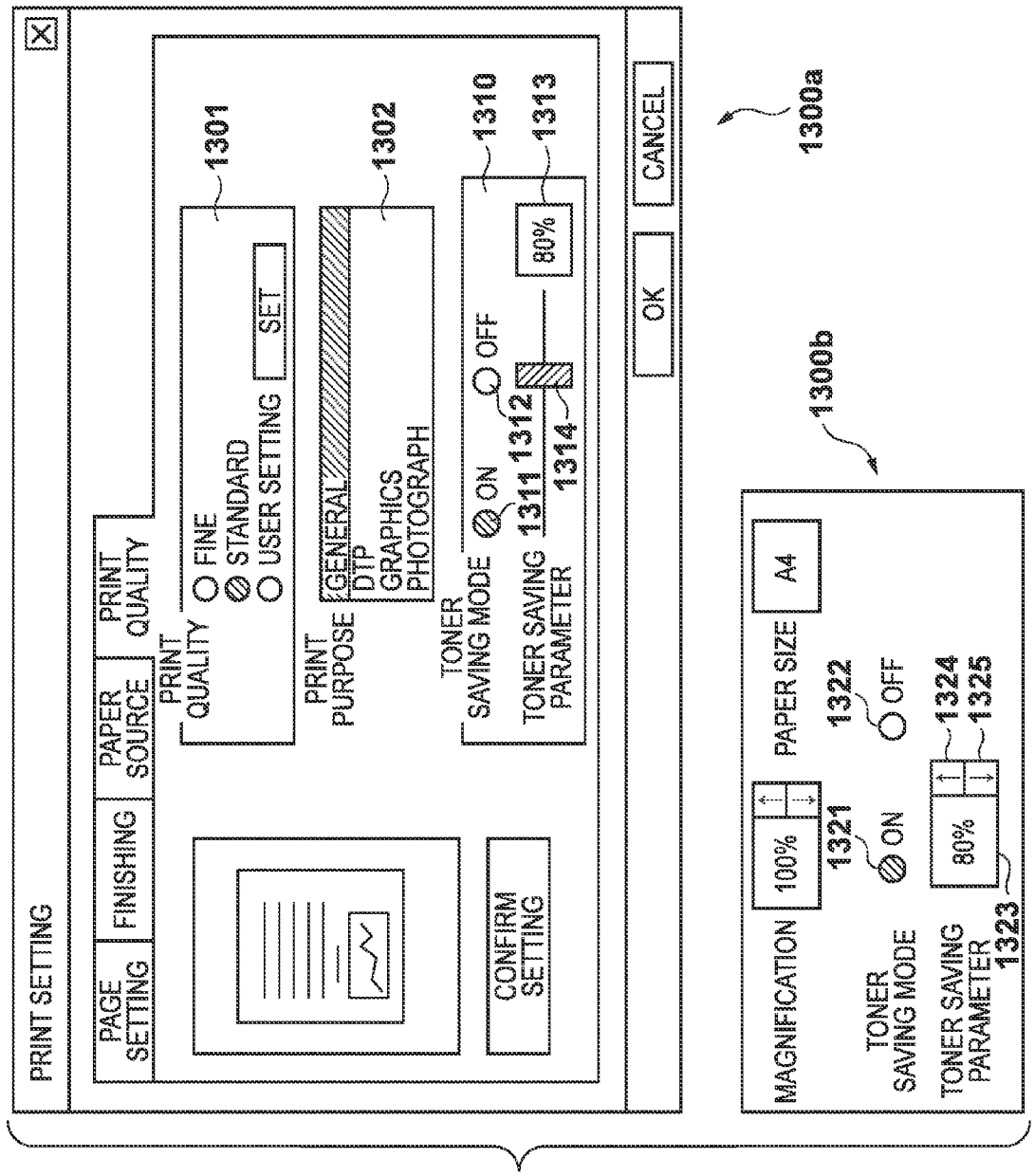
FIG. 13 shows an example of a setting screen associated with toner saving processing.

FIG. 13 shows an example of setting screen displayed on a display panel unit of a host PC 200 by a printer driver which runs on the host PC 200. A setting screen 1300a shown in FIG. 13 allows the user to make settings about print quality of those used in printing. An item 1301 is used to make a setting associated with print quality such as a halftone table and color conversion table used in printing. The user can select "fine" or "standard" which is prepared in advance or can input detailed settings as user settings in the item 1301. An item 1302 is used to make a setting about a type of a printed matter (print purpose). The user can easily set, for example, a halftone table and color conversion table suited to a type of a printed matter by selecting one of options displayed in the item 1302.

An item 1310 is used to make settings associated with a toner saving mode, and the user can set a setting about permission/inhibition of toner saving processing and that of a toner saving parameter S associated with the present invention. When the user selects "ON" as an item 1311 and executes a print operation, a permission setting of toner saving processing is sent to a printer 100 as control data. On the other hand, when the user selects "OFF" as an item 1312 and executes a print operation, an inhibition setting of toner saving processing is sent to the printer 100 as control data. An item 1313 is used to set a toner saving parameter S (%). This toner saving parameter S (%) is a parameter (adjustment value) required to set how much toner amounts are to be decreased or increased from conversion results obtained when color image data are color-converted by a predetermined color conversion method, and the converted data is further converted into data of a predetermined unit (for example, an amount of a color material).

The user can increase or decrease the value of the toner saving parameter S indicated by the item 1313 by operating a slider 1314. Note that the toner saving parameter S can be set to be 100% or higher. When the user executes a print operation, the value set in the item 1313 is sent to the printer 100 as control data about the toner saving parameter S.

The settings associated with the toner saving processing according to the present invention may be made on the host PC 200 side, as described above, or on the printer 100. FIG. 13 shows an example of a setting screen 1300b, which is displayed on a display panel of a panel IF 313 on the printer 100. In this embodiment, the display panel has a touch panel on its surface. The user can select or set respective items displayed on the display panel by pressing the touch panel. Note that the user may select or set using buttons (for example, hardware keys provided to an operation unit) which are not displayed as the setting screen on the display panel.

When the user selects "ON" as an item 1321, the "permission" of toner saving processing is set. On the other hand, when the user selects "OFF" as an item 1322, "inhibition" of toner saving processing is set. An item 1323 is used to set a toner saving parameter S (%). When the user presses "↑" as an item 1324, the value of the toner saving parameter S displayed in the item 1323 is increased. On the other hand, when the user presses "↓" as an item 1325, the value of the toner saving parameter S displayed in the item 1323 is decreased. A CPU 303 sends the permission/inhibition setting of toner saving processing and the toner saving parameter S set on the panel IF 313 to a toner saving processor 406 as control information.

This embodiment allows the user to set parameters such as a permission/inhibition setting of toner saving processing and a toner saving parameter, which are required in the present invention, via the screen displayed on the display unit by the printer driver in the host PC 200 or that on the display panel unit of the printer 100. Thus, the user can easily set parameters associated with the toner saving processing of the present invention.

[Eighth Embodiment]

In the aforementioned first to sixth embodiments, color conversion, conversions from tone values into toner amounts, those from toner amounts into toner costs, and the like are attained using table information such as a color conversion table, tone value—toner amount tables (FIG. 6), a cost coefficient table (FIG. 16), and the like, which are prepared in advance. However, these conversion processes can be executed by preparing calculation formulas corresponding to the table information in advance, and using these calculation formulas in place of using the table information. A conversion process from tone values R, G, and B into a tone value Km is executed using a calculation formula exemplified as equation (1). Alternatively, table information corresponding to this calculation formula can be prepared in advance, and that conversion process can be executed using the table information. In this manner, whether table information prepared in advance or calculation formulas are to be used in processes in respective steps in the flowcharts shown in FIGS. 7A, 7B, 9, 11, 15, 18A and 18B can be arbitrarily decided.

Also, table information or calculation formulas used to execute a plurality of steps together by single processing in the processes according to the flowcharts shown in FIGS. 7A, 7B, 9, 11, 15, 18A and 18B can be prepared. For example, in FIG. 9, a toner amount reduction ratio D can be directly decided using one table information, which is prepared in advance, from tone values R, G, and B, or corresponding tone values C, M, Y, and K of pixels extracted from an input color image. This is because when the tone values R, G, and B, or corresponding tone values C, M, Y, and K, which are to undergo the toner saving processing, are set, processing results in steps S205 to S208 are uniquely set by calculation formulas or table information. Likewise, processes in steps S209 and S210 can be combined into one table information, since they are uniquely set according to the tone values R, G, and B, or corresponding tone values C, M, Y, and K, which are to undergo the toner saving processing, and a toner amount reduction ratio D. In this case, processes in steps S205 to S210 can be executed using one table information, which is prepared in advance. For this reason, tone values C, M, Y, and K after the toner saving processing can be directly calculated from the tone values R, G, and B, or corresponding tone values C, M, Y, and K which are to undergo the toner saving processing. Also, in FIG. 11 as well, for example, processes in steps S205 and S207 can be combined into single processing using one table information.

In the aforementioned seventh embodiment, some toner saving parameters S (%), which can be designated by the user, may be prepared in advance, and the aforementioned calculation formulas or table information may be used in correspondence with respective toner saving parameters.

Note that in the aforementioned first to sixth embodiments, tone values of an input color image are converted into a monochrome tone value by a color conversion method which converts the tone values into a grayscale value. However, these embodiments are not limited to such specific color conversion method, and can use an arbitrary color conversion method (for example, a color conversion into a sepia tone). That is, an arbitrary color conversion method is applicable as long as it can decrease the amount of color materials consumed that are to be smaller than those required to form a color image based on full-color data.

In these embodiments, toner saving processing is executed using values obtained by converting tone values for n pixels extracted from an input color image and a tone value of an image after the color conversion into toner amounts or toner costs. That is, as a conversion of a tone value required to execute the toner saving processing, a conversion into a unit of a weight when a color image is converted into a toner amount or that of a cost when a color image is converted into a toner cost (cost of a color material) is used. However, the conversion of a tone value required to execute the toner saving processing can use that into an arbitrary predetermined unit in addition to those into a toner amount and toner cost.

In the aforementioned first to sixth embodiments, a toner amount reduction ratio D and target toner amount (target toner cost) are decided according to the toner saving parameter S. Alternatively, the toner saving processing can be executed without using the toner saving parameter S. This corresponds to, for example, a case in which S=1 in equations (2), (4), and (12), and a case in which the target toner amount (target toner cost) is set to be equal to Akm (Pkm).

Also, a target toner amount (target toner cost) according to the third (or sixth) embodiment can be a value equal to a conversion result obtained when input image data are color-converted by a predetermined color conversion method and the converted data is further converted into a toner amount (or toner cost), or can be a value which is included within a predetermined range from the conversion result. That is, in place of setting a value, which is strictly equal to the conversion result, as the target toner amount (target toner cost), a certain width may be given, as described above with reference to equations (8) and (15). Even in such case, the same effects as in the aforementioned embodiments can be obtained.

[Other Embodiments]

The toner saving processing described in each of the aforementioned embodiments can be executed by a copying machine which includes an image scanner, in addition to an image forming apparatus (printer 100) which receives drawing data from a host PC. In this case, drawing data required to form an image can be obtained by scanning a document image by the image scanner. In the present invention, table data such as tone value—toner amount tables and cost coefficient table may be pre-stored in memory tags included in toner cartridges 25Y, 25M, 25C, and 25K in place of a ROM 304. Alternatively, the table data which are held in advance by a host PC 200 may be sent to the image forming apparatus. Even in such case, the image forming apparatus can execute the toner saving processing of the present invention using the received table data. Furthermore, when a gamma correction table, halftone table, and the like are changed according to changes of print quality settings, an operation for automatically changing the tone value—toner amount tables and cost coefficient table may be executed accordingly.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-195133 filed Aug. 31, 2010 and 2010-195134 filed Aug. 31, 2010, which are hereby incorporated by reference herein in their entirety.

What is claimed is:

1. A color image processing apparatus, which applies image processing to image data of an input color image, and outputs the processed image data, comprising:
   a conversion unit configured to convert image data of the color image into a first color material amount, and to convert the image data into a second color material amount which is less than the first color material amount by a predetermined color conversion method;
   a change unit configured to change the first color material amount based on the second color material amount obtained by the conversion unit; and
   a reconversion unit configured to reconvert the first color material amount changed by the change unit into image data of the color image.

2. The apparatus according to claim 1, wherein the change unit comprises a determination unit configured to determine whether or not a temporary conversion result obtained when tone values of respective colors of the image data are changed to be decreased, and image data of the decreased tone values of the respective colors are converted into color material amounts matches a target value according to a reference conversion result, the reference conversion result being obtained when the image data are color-converted by the predetermined color conversion method and the converted data is further converted into the second color material amount, and
   when the determination unit determines that the temporary conversion result does not match the target value, the change unit changes tone values of the respective colors of the image data, so that the temporary conversion result is closer to the target value.

3. The apparatus according to claim 2, wherein the target value is a value equal to the reference conversion result obtained when the image data are color-converted by the predetermined color conversion method and the converted data is further converted into the second color material amount, or a value included in a predetermined range from the reference conversion result obtained when the image data are color-converted by the predetermined color conversion method and the converted data is further converted into the second color material amount.

4. The apparatus according to claim 2, wherein the target value is an adjustment value obtained by increasing or decreasing the reference conversion result obtained when the image data are color-converted by the predetermined color conversion method, and the converted data is further converted into the second color material amount.

5. The apparatus according to claim 4, further comprising a setting unit configured to set the adjustment value according to a user's operation.

6. The apparatus according to claim 1, further comprising an extraction unit configured to extract tone values of respective colors of a plurality of pixels for units of n pixels, wherein n is an integer not less than 1, in turn from the image data of the input color image,
   wherein the conversion unit converts the image data extracted by the extraction unit on a n-pixel basis.

7. The apparatus according to claim 1, wherein the predetermined color conversion method is a color conversion method for converting extracted image data of the color image into a grayscale image.

8. The apparatus according to claim 1, wherein the change unit changes the first color material amount so as to decrease the first color material amount based on the second color material amount.

9. The apparatus according to claim 1, further comprising an extraction unit configured to extract tone values of respective colors of a plurality of pixels on a page basis from the image data of the input color image,
   wherein the conversion unit converts the image data extracted by the extraction unit on a page basis.

10. The apparatus according to claim 1, wherein the first color material amount is an amount for image formation based on image data of the color image using a plurality of colors, and the second color material amount is an amount for image formation based on image data of the color image using a single color.

11. The apparatus according to claim 1, wherein the first color material amount is an amount for image formation based on image data of the color image using a color toner, and the second color material amount is an amount for image formation based on image data of the color image using a black toner.

12. The apparatus according to claim 1, wherein the first and second color material amounts are toner amounts.

13. A color image processing apparatus, which applies image processing to image data of an input color image, and outputs the processed image data, comprising:
   an extraction unit configured to extract image data on a n-pixel basis, wherein n is an integer not less than 1, from the image data before conversion into data of a predetermined unit being applied;
   a conversion unit configured to convert image data on a n-pixel basis extracted by the extraction unit into a first conversion result of the predetermined unit, and to perform color conversion of the image data on a n-pixel basis extracted by the extraction unit by a predetermined color conversion method and further convert the color conversion result into a second conversion result of the predetermined unit;
   a change unit configured to change the first conversion result based on the second conversion result; and
   a reconversion unit configured to reconvert the first conversion result changed by the change unit into image data of the color image.

14. The apparatus according to claim 13, wherein the change unit comprises a determination unit configured to determine whether or not a temporary conversion result obtained when tone values of respective colors of the image data are changed to be decreased, and image data of the decreased tone values of the respective colors are converted into data of the predetermined unit matches a target value according to the second conversion result, second conversion result being obtained when the image data are color-converted by the predetermined color conversion method and the converted data is further converted into data of the predetermined unit, and
   when the determination unit determines that the temporary conversion result does not match the target value, the change unit changes tone values of the respective colors of the image data, so that the temporary conversion result is closer to the target value.

15. The apparatus according to claim 14, wherein the target value is a value equal to the second conversion result obtained when the image data are color-converted by the predetermined color conversion method and the converted data is further converted into data of the predetermined unit, or a value included in a predetermined range from the second conversion result obtained when the image data are color-converted by the predetermined color conversion method, and the converted data is further converted into data of the predetermined unit.

16. The apparatus according to claim 14, wherein the target value is an adjustment value obtained by increasing or decreasing the second conversion result obtained when the image data are color-converted by the predetermined color conversion method, and the converted data is further converted into data of the predetermined unit.

17. The apparatus according to claim 16, further comprising a setting unit configured to set the adjustment value according to a user's operation.

18. The apparatus according to claim 13, wherein the predetermined unit is a unit of a weight when image data of a color image is converted into an amount of a color material or a unit of a cost when image data of a color image is converted into a cost of a color material.

19. The apparatus according to claim 13, wherein the predetermined color conversion method is a color conversion method for converting the image data of the color image into a grayscale image.

20. A non-transitory computer-readable storage medium storing a program for controlling a computer to function as a color image processing apparatus, which applies image processing to image data of an input color image, and outputs the processed image data, said program controlling the computer to function as the color image processing apparatus which comprises:
 a conversion unit configured to convert image data of the color image into a first color material amount, and to convert the image data into a second color material amount which is less than the first color material amount by a predetermined color conversion method; a change unit configured to change the first color material amount based on the second color material amount obtained by the conversion unit; and
 a reconversion unit configured to reconvert the first color material amount changed by the change unit into image data of the color image.

21. A non-transitory computer-readable storage medium storing a program for controlling a computer to function as a color image processing apparatus which applies image processing to image data of an input color image, and outputs the processed image data, said program controlling the computer to function as the color image processing apparatus which comprises:
 an extraction unit configured to extract image data for units of n pixels, wherein n is an integer not less than 1, from the image data before conversion into data of a predetermined unit being applied;
 a conversion unit configured to convert image data on a n-pixel basis extracted by the extraction unit into a first conversion result of the predetermined unit, and to perform color conversion of the image data on a n-pixel basis extracted by the extraction unit by a predetermined color conversion method and further convert the color conversion result into a second conversion result of the predetermined unit;
 a change unit configured to change the first conversion result based on the second conversion result; and
 a reconversion unit configured to reconvert the first conversion result changed by the change unit into image data of the color image.

22. The apparatus according to claim 13, wherein the extraction unit extracts image data image data on a n-pixel basis, wherein n is an integer not less than 1, the n-pixel being less than a total number of pixels of the image data.

23. The apparatus according to claim 13, wherein the first color material amount is an amount for image formation based on image data of the color image using a plurality of colors, and the second color material amount is an amount for image formation based on image data of the color image using a single color.

24. The apparatus according to claim 13, wherein the first color material amount is an amount for image formation based on image data of the color image using a color toner, and the second color material amount is an amount for image formation based on image data of the color image using a black toner.

25. The apparatus according to claim 13, wherein the first and second color material amounts are toner amounts.

* * * * *